United States Patent
Shimada et al.

[11] Patent Number: 6,125,306
[45] Date of Patent: Sep. 26, 2000

[54] SYSTEM FOR CONTROLLING PHYSICAL DISTRIBUTION PALLETS

[75] Inventors: Takanori Shimada, Tokyo; Akihiro Abe; Kazuo Kobashi, both of Yokohama, all of Japan

[73] Assignee: Matsushita Electric Industrial Co., Ltd., Osaka, Japan

[21] Appl. No.: 09/190,278

[22] Filed: Nov. 13, 1998

Related U.S. Application Data

[63] Continuation of application No. 08/732,099, Oct. 15, 1996.

[30] Foreign Application Priority Data

Oct. 13, 1995 [JP] Japan ................................ 7-290642
Nov. 7, 1995 [JP] Japan ................................ 7-311679

[51] Int. Cl.[7] ........................................ G06F 17/60
[52] U.S. Cl. .................. 700/217; 700/218; 700/213; 700/228; 700/229
[58] Field of Search ..................... 364/478.03, 478.04, 364/478.05, 478.13, 478.14, 478.16; 414/798, 273; 700/217, 218, 228, 229; 340/825.35, 825.01; 342/51, 42; 499/38.2; 705/28

[56] References Cited

U.S. PATENT DOCUMENTS

| | | | |
|---|---|---|---|
| Re. 33,416 | 10/1990 | Konishi et al. | 364/478 |
| 4,921,087 | 5/1990 | Nakamura | 414/273 |
| 4,937,581 | 6/1990 | Baldwin et al. | 342/44 |
| 5,006,996 | 4/1991 | Nakamura et al. | 364/478.03 |
| 5,113,349 | 5/1992 | Nakamura et al. | 364/478.03 |
| 5,260,694 | 11/1993 | Remahl | 364/478.14 |
| 5,317,318 | 5/1994 | Thomas et al. | 342/44 |
| 5,475,604 | 12/1995 | Nagamatsu | 364/478.05 |
| 5,568,393 | 10/1996 | Ando et al. | 364/478.02 |
| 5,648,765 | 7/1997 | Cresap et al. | 340/825.35 |
| 5,649,296 | 7/1997 | MacLellan et al. | 455/38.2 |
| 5,734,574 | 3/1998 | Yamashita et al. | 364/478.03 |
| 5,757,650 | 5/1998 | Yamashita et al. | 364/478.02 |
| 5,774,876 | 6/1998 | Woolley et al. | 705/28 |
| 5,815,398 | 9/1998 | Dighe et al. | 364/478.05 |
| 5,877,962 | 3/1999 | Radcliffe | 364/478.03 |

FOREIGN PATENT DOCUMENTS

| | | |
|---|---|---|
| 0 237 344 | 9/1987 | European Pat. Off. . |
| 62-001070 | 1/1987 | Japan . |
| 62-259411 | 11/1987 | Japan . |

*Primary Examiner*—David H. Bollinger
*Assistant Examiner*—Michael E. Butler
*Attorney, Agent, or Firm*—Lowe Hauptman Gopstein Gilman & Berner

[57] ABSTRACT

A system for controlling physical distribution pallets makes it possible to accurately identify status of pallets, to set up an adequate forwarding plan of pallets, and to accomplish physical distribution in smooth manner. The system includes a wireless detector device mounted on pallets and for detecting pallet control information transmitted from transmitting means 21 which stores pallet control information of said pallet and transmits in wireless, a pallet stock data storage for receiving and storing the pallet control information detected by the wireless detector via a wide area communication network, and a pallet status judging device for judging whether the pallet stored in memory of the pallet stock data storage is empty or not based on the pallet control information of said pallet. Further, the invention includes a supply and demand predictor for predicting supply and demand of pallets at physical distribution bases and a planning device for setting up a forwarding plan for forwarding pallets at minimal cost between physical distribution bases. It is possible according to the present system to accurately identify the status of pallets, to set up an adequate forwarding plan for pallets, and to accomplish smooth physical distribution.

20 Claims, 38 Drawing Sheets

FIG. 2

| PALLET ID | POSITION INFORMATION | DETECTION TIME | PALLET STATUS |
|---|---|---|---|
| P−1011 | TOKYO WAREHOUSE A | AUGUST 29, 1995 14:30 | EMPTY |
| P−1251 | TOKYO WAREHOUSE A | AUGUST 29, 1995 15:10 | ARRIVED |
| ≈ | ≈ | ≈ | ≈ |
| | | | |

PALLET MOVEMENT CONTROL TABLE

| DISTRIBUTION BASES | EMPTY PALLET STANDARD STOCK QUANTITY | CURRENT QUANTITY OF EMPTY PALLETS |
|---|---|---|
| TOKYO | 1000 | 750 |
| OSAKA | 800 | 900 |
| ≈ | ≈ | ≈ |
| | | |

EMPTY PALLET STOCK TABLE

FIG. 4

| NAME OF TRANSPORT SERVICE | PLACE OF DEPARTURE | PLACE OF ARRIVAL | DEPARTURE TIME | ARRIVAL TIME | AVERAGE QUANTITY OF LOADED PALLETS |
|---|---|---|---|---|---|
| TRANSPORT SERVICE A | TOKYO | OSAKA | 9:00 | 16:00 | 25 |
| TRANSPORT SERVICE B | TOKYO | OSAKA | 12:00 | 13:00 | 10 |
| ≈ | ≈ | ≈ | ≈ | ≈ | ≈ |

TRANSPORT SCHEDULE TABLE

FIG. 5

| RULE No. | CONDITION UNIT | EXECUTION UNIT |
|---|---|---|
| RULE 1 | No. OF SERVICE ARRIVING AT GENERAL TRANSFER BASE | AVERAGE DAILY SERVICES : 5 |
| RULE 2 | YEAR END PERIOD (NOV. 25 – DEC. 20) | TRANSPORT BETWEEN AOMORI AND TOKYO INCREASED BY 10% |
| ≈ | ≈ | ≈ |

TRANSPORT KNOWLEDGE TABLE

| RULE No. | CONDITION UNIT | EXECUTION UNIT |
|---|---|---|
| RULE 1 | PALLET HOLDING ABILITY OF KAWASAKI WAREHOUSE | 2000 PALLETS |
| RULE 2 | FORWARDING DESTINATION OF EMPTY PALLETS OF HAKATA | OSAKA ONLY |
| ≈ | ≈ | ≈ |

CONSTRAINT TABLE

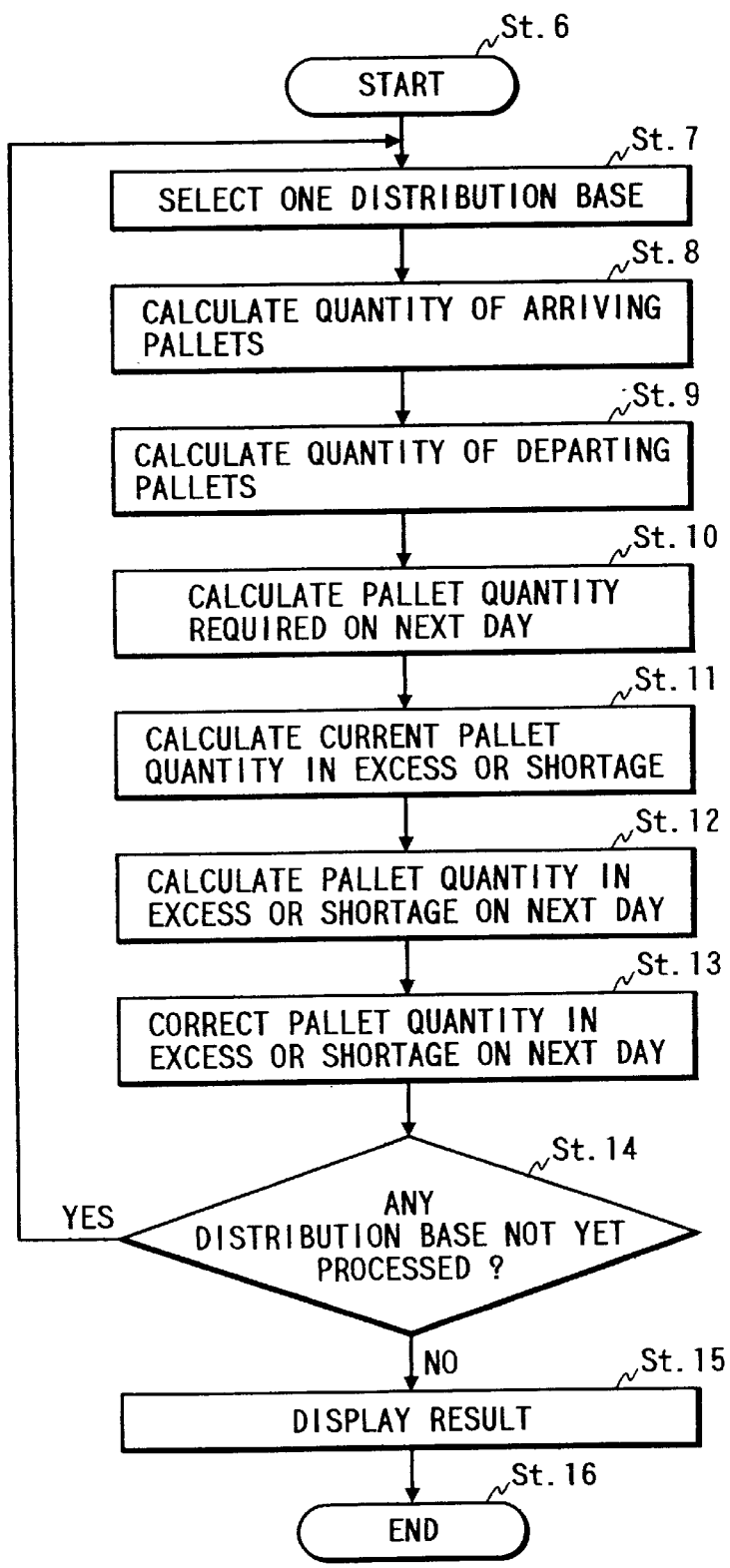

FIG. 8

| MAJOR TRANSFER BASE | LOWER LEVEL BASES |
|---|---|
| TOKYO DISTRIBUTION CENTER | SHINAGAWA OFFICE |
| TOKYO DISTRIBUTION CENTER | SHINJUKU OFFICE |
| YOKOHAMA DISTRIBUTION CENTER | KOUHOKU OFFICE |
| OSAKA DISTRIBUTION CENTER | HIRAKATA OFFICE |
| ⋮ | ⋮ |

(a) MAJOR TRANSFER BASE LAYER TABLE

| GENERAL TRANSFER BASES | UPPER LEVEL BASES | LOWER LEVEL BASES |
|---|---|---|
| SHINAGAWA OFFICE | TOKYO DISTRIBUTION CENTER | SHINAGAWA EKIMAE ELECTRICAL APPLIANCES STORE |
| SHINAGAWA OFFICE | TOKYO DISTRIBUTION CENTER | HIGASHI SHINAGAWA ELECTRICAL APPLIANCES STORE |
| SHINAGAWA OFFICE | TOKYO DISTRIBUTION CENTER | MINAMI SHINAGAWA ELECTRICAL APPLIANCES STORE |
| KOUHOKU OFFICE | YOKOHAMA DISTRIBUTION CENTER | ICHIGAO ELECTRICAL APPLIANCES STORE |
| KOUHOKU OFFICE | YOKOHAMA DISTRIBUTION CENTER | EDA ELECTRICAL APPLIANCES STORE |

(b) GENERAL TRANSFER BASE LAYER TABLE

| COLLECTION AND DELIVERY BASES | UPPER LEVEL BASES |
|---|---|
| SHINAGAWA EKIMAE ELECTRICAL APPLIANCES STORE | SHINAGAWA OFFICE |
| HIGASHI SHINAGAWA ELECTRICAL APPLIANCES STORE | SHINAGAWA OFFICE |
| MINAMI SHINAGAWA ELECTRICAL APPLIANCES STORE | SHINAGAWA OFFICE |
| ICHIGAO ELECTRICAL APPLIANCES STORE | KOUHOKU OFFICE |
| EDA ELECTRICAL APPLIANCES STORE | KOUHOKU OFFICE |

(c) COLLECTION AND DELIVERY BASE LAYER TABLE

FIG. 12A

| NODE NAME | LONGITUDE | LATITUDE |
|---|---|---|
| 1 | 126.5 | 578.2 |
| 2 | 218.6 | 581.9 |
| ≈ | ≈ | ≈ |

NODE TABLE

FIG. 12B

| ARC NAME | STARTING POINT | END POINT | DISTANCE |
|---|---|---|---|
| A | 1 | 2 | 106.3 |
| B | 3 | 5 | 55.2 |
| ≈ | ≈ | ≈ | ≈ |

ARC TABLE

FIG. 12C

| TRANSPORT NODE | NEAREST ROAD NODE |
|---|---|
| TOKYO DISTRIBUTION CENTER | 3 |
| SHINAGAWA OFFICE | 21 |
| SHINAGAWA EKIMAE ELECTRICAL APPLIANCES STORE | 18 |

TRANSPORT NODE CORRESPONDENCE TABLE

FIG. 27

TRANSPORT COST BETWEEN BASES

|  | AOMORI | MORIOKA | SENDAI | YAMAGATA |
|---|---|---|---|---|
| AOMORI | 0 | 100 | 300 | 250 |
| MORIOKA | 100 | 0 | 200 | 150 |
| SENDAI | 300 | 200 | 0 | 50 |
| YAMAGATA | 250 | 150 | 50 | 0 |

FIG. 28

QUANTITY IN EXCESS OR SHORTAGE AT EACH BASE

| BASES | QUANTITY IN EXCESS OR SHORTAGE |
|---|---|
| AOMORI | -50 |
| MORIOKA | -100 |
| SENDAI | 300 |
| YAMAGATA | -100 |

FIG. 29

| DISTRIBUTION BASES | STANDARD STOCK QUANTITY | Q'TY IN EXCESS OR SHORTAGE ON DAY 1 | Q'TY IN EXCESS OR SHORTAGE ON DAY 2 |
|---|---|---|---|
| SAPPORO | 200 | 50 | 70 |
| SENDAI | 100 | -20 | -10 |
| URAWA | 300 | -70 | -50 |
| OSAKA | 600 | -200 | -300 |
| HIROSHIMA | 100 | 140 | 200 |
| FUKUOKA | 0 | 100 | 90 |

FIG. 30

TRANSPORT COST BETWEEN BASES

| | | |
|---|---|---|
| SAPPORO | SENDAI | 100 |
| SAPPORO | URAWA | 200 |
| SAPPORO | OSAKA | 400 |
| SAPPORO | HIROSHIMA | 700 |
| SAPPORO | FUKUOKA | 1000 |
| SENDAI | URAWA | 100 |
| SENDAI | OSAKA | 300 |
| ........ | ........ | ........ |

FIG. 31

SUPPLY AND DEMAND TABLE ON DAY 1

|    |          | D1 SENDAI | D2 URAWA | D3 OSAKA |     |
|----|----------|-----------|----------|----------|-----|
| S1 | SAPPORO  | 100       | 200      | 400      | 50  |
| S2 | HIROSHIMA| 700       | 500      | 300      | 140 |
| S3 | FUKUOKA  | 1000      | 800      | 400      | 100 |
|    |          | 20        | 70       | 200      |     |

FIG. 32

INPUT EQUATIONS TO LINEAR PROGRAMMING MEANS $X_{ij}$ : PALLET QUANTITY FORWARDED FROM BASE "i" TO BASE "j"

Min  $100X_{11} + 200X_{12} + 400X_{13} + 700X_{21} + 500X_{22} + 300X_{23} + 1000X_{31} + 800X_{32} + 400X_{33}$

SUBJECT TO
$$X_{11} + X_{12} + X_{13} \leq 50$$
$$X_{21} + X_{22} + X_{23} \leq 140$$
$$X_{31} + X_{32} + X_{33} \leq 100$$
$$X_{11} + X_{21} + X_{31} \geq 20$$
$$X_{12} + X_{22} + X_{32} \geq 70$$
$$X_{13} + X_{23} + X_{33} \geq 200$$

FIG. 33

OUTPUT EQUATIONS FROM LINEAR PROGRAMMING MEANS $$X11 = 10$$
$$X12 = 20$$
$$X13 = 15$$
$$X21 = 30$$
$$X22 = 40$$
$$X23 = 50$$
$$X31 = 20$$
$$X32 = 30$$
$$X33 = 40$$

FIG. 34

MARCH 4

| FROM | TO | No. OF TRANSPORT SERVICES |
|---|---|---|
| SAPPORO | SENDAI | 10 |
| SAPPORO | URAWA | 20 |
| SAPPORO | OSAKA | 15 |
| HIROSHIMA | SENDAI | 30 |
| HIROSHIMA | URAWA | 40 |
| HIROSHIMA | OSAKA | 50 |
| FUKUOKA | SENDAI | 20 |
| FUKUOKA | URAWA | 30 |
| FUKUOKA | OSAKA | 40 |

FIG. 35

PALLET DATA AT ASAHIKAWA

| DEPARTING POINT | ARRIVAL POINT | TIME | PALLET Q'TY |
|---|---|---|---|
| SAPPORO | ASAHIKAWA | 3:40 | 28 |
| TOKYO | ASAHIKAWA | 5:30 | 59 |
| SAPPORO | ASAHIKAWA | 7:20 | 10 |
| SAPPORO | ASAHIKAWA | 8:20 | 20 |
| ASAHIKAWA | SAPPORO | 9:40 | 20 |
| ASAHIKAWA | SAPPORO | 10:00 | 50 |
| ASAHIKAWA | HOROSHIMA | 11:30 | 23 |
| ASAHIKAWA | FUKUOKA | 12:40 | 58 |
| SENDAI | ASAHIKAWA | 14:50 | 28 |
| URAWA | ASAHIKAWA | 15:40 | 15 |
| ......... | ......... | ......... | ......... |

FIG. 36

COMPLEMENTARY DIFFERENCE OF PALLETS AT BASES

| DISTRIBUTION BASES | STANDARD STOCK Q'TY | COMPLEMENTARY DIFFERENCE ON DAY 1 | Q'TY IN EXCESS OR SHORTAGE ON DAY 2 |
|---|---|---|---|
| SAPPORO | 200 | 50 | 70 |
| SENDAI | 100 | -20 | -10 |
| URAWA | 300 | 70 | -50 |
| OSAKA | 600 | 200 | 300 |
| HIROSHIMA | 100 | 140 | 200 |
| FUKUOKA | 0 | 100 | 90 |

FIG. 37

Q'TY IN EXCESS OR SHORTAGE AT BASES

| DISTRIBUTION BASES | STANDARD STOCK Q'TY | DAY 1 | DAY 2 | DAY 3 |
|---|---|---|---|---|
| SAPPORO | 200 | 50 | 70 | 30 |
| SENDAI | 100 | -20 | 10 | 0 |
| URAWA | 300 | -70 | 50 | 60 |
| OSAKA | 600 | 200 | -300 | 70 |
| HIROSHIMA | 100 | 140 | 200 | 0 |
| FUKUOKA | 0 | 100 | 90 | 100 |

FIG. 38

SUPPLY AND DEMAND TABLE ON DAY 2

|  |  | D1 SENDAI | D2 URAWA | D3 OSAKA |  |
|---|---|---|---|---|---|
| S1 | SAPPORO | 100 | 200 | 400 | 120 |
| S2 | HIROSHIMA | 700 | 500 | 300 | 340 |
| S3 | FUKUOKA | 1000 | 800 | 400 | 190 |
|  |  | 30 | 120 | 500 |  |

FIG. 39

INPUT EQUATIONS TO LINEAR PROGRAMMING MEANS $X_{ij}$ : PALLET QUANTITY FORWARDED FROM BASE "i" TO BASE "j"

Min   $100X11 + 200X12 + 400X13 + 700X21 + 500X22 + 300X23 + 1000X31 + 800X32 + 400X33$

SUBJECT TO
$$X11 + X12 + X13 \leq 120$$
$$X21 + X22 + X23 \leq 340$$
$$X31 + X32 + X33 \leq 190$$
$$X11 + X21 + X31 \geq 30$$
$$X12 + X22 + X32 \geq 120$$
$$X13 + X23 + X33 \geq 500$$

FIG. 40

OUTPUT EQUATIONS FROM LINEAR PROGRAMMING MEANS $$X11 = 10$$
$$X12 = 20$$
$$X13 = 15$$
$$X21 = 30$$
$$X22 = 40$$
$$X23 = 50$$
$$X31 = 20$$
$$X32 = 30$$
$$X33 = 40$$

FIG. 41

TIMETABLE FOR TRANSPORT SERVICES

| DEPARTURE POINT | ARRIVAL POINT | TIME |
|---|---|---|
| SAPPORO | SENDAI | 3:40 |
| TOKYO | SAPPORO | 5:30 |
| SAPPORO | URAWA | 7:20 |
| SAPPORO | OSAKA | 8:20 |
| OSAKA | SAPPORO | 9:40 |
| AOMORI | SAPPORO | 10:00 |
| SAPPORO | HIROSHIMA | 11:30 |
| SAPPORO | FUKUOKA | 12:40 |
| SENDAI | SAPPORO | 2:50 |
| URAWA | SAPPORO | 4:40 |
| ......... | ......... | ......... |

FIG. 42

| DISTRIBUTION BASES | STANDARD STOCK QUANTITY | 0:00 | 1:00 | 2:00 | 3:00 | ...... |
|---|---|---|---|---|---|---|
| SAPPORO | 200 | 50 | 120 | 30 | 150 | ...... |

FIG. 43

TIMETABLE FOR TRANSPORT SERVICES

| DEPARTURE POINT | ARRIVAL POINT | TIME |
|---|---|---|
| SAPPORO | SENDAI | 3:40 |
| TOKYO | SAPPORO | 5:30 |
| SAPPORO | URAWA | 7:20 |
| SAPPORO | OSAKA | 8:20 |
| OSAKA | SAPPORO | 9:40 |
| AOMORI | SAPPORO | 10:00 |
| SAPPORO | HIROSHIMA | 11:30 |
| SAPPORO | FUKUOKA | 12:40 |
| SENDAI | SAPPORO | 2:50 |
| URAWA | SAPPORO | 4:40 |
| ......... | ......... | ......... |

FIG. 44

DEFAULT VALUE OF STANDARD STOCK QUANTITY sappo − 200
senda − 100
urawa − 300
osaka − 600
hiros − 100
fuk   − 0

FIG. 45

DATA BEFORE SETTING

| DISTRIBUTION BASES | STANDARD STOCK QUANTITY | DAY 1 | DAY 2 | DAY 3 |
|---|---|---|---|---|
| SAPPORO | sapp | 50 | 70 | 30 |
| SENDAI | sendai | -20 | -10 | 0 |
| URAWA | urawa | -70 | -50 | -60 |
| OSAKA | osaka | -200 | -300 | -70 |
| HIROSHIMA | hirosh | 100 | 140 | 200 |
| FUKUOKA | fuk | 100 | 90 | 100 |

FIG. 46

DATA AFTER SETTING

| DISTRIBUTION BASES | STANDARD STOCK QUANTITY | DAY 1 | DAY 2 | DAY 3 |
|---|---|---|---|---|
| SAPPORO | 200 | 50 | 120 | 30 |
| SENDAI | 100 | -20 | -30 | 0 |
| URAWA | 400 | -70 | -120 | -60 |
| OSAKA | 600 | -200 | -500 | -90 |
| HIROSHIMA | 100 | 140 | 340 | 10 |
| FUKUOKA | 0 | 100 | 190 | 110 |

FIG. 47

| DISTRICT NAME | DISTRIBUTION BASE | STANDARD STOCK QUANTITY | QUANTITY IN EXCESS OR SHORTAGE |
|---|---|---|---|
| TOUHOKU | SENDAI | 100 | 50 |
| TOUHOKU | MORIOKA | 20 | -20 |
| TOUHOKU | AOMORI | 30 | -70 |
| KANTOU | MAEBASHI | 100 | -200 |
| KANTOU | URAWA | 200 | 140 |
| KANTOU | YOKOHAMA | 300 | 100 |
| KYUSHU | FUKUOKA | 150 | 50 |
| KYUSHU | SAGA | 0 | -20 |
| KYUSHU | OOITA | 0 | 10 |

FIG. 48

| DISTRICT NAME | Q'TY IN EXCESS OR SHORTAGE |
|---|---|
| TOUHOKU | -40 |
| KANTOU | 40 |
| KYUSHU | 40 |

FIG. 49

TIMETABLE FOR TRANSPORT SERVICES AT SAPPORO

| DEPARTING POINT | ARRIVAL POINT | TIME | PALLET Q'TY | DISTRIBUTION BASE |
|---|---|---|---|---|
| SAPPORO | SENDAI | 3:40 | 15 | TOKYO |
| TOKYO | SAPPORO | 5:30 | 22 | TOKYO |
| SAPPORO | URAWA | 7:20 | 34 | TOKYO |
| SAPPORO | OSAKA | 8:20 | 58 | TOKYO |
| OSAKA | SAPPORO | 9:40 | 22 | TOKYO |
| AOMORI | SAPPORO | 10:00 | 43 | TOKYO |
| SAPPORO | HIROSHIMA | 11:30 | 23 | TOKYO |
| SAPPORO | FUKUOKA | 12:40 | 55 | TOKYO |
| SENDAI | SAPPORO | 2:50 | 25 | TOKYO |
| URAWA | SAPPORO | 4:40 | 38 | TOKYO |

SYSTEM FOR CONTROLLING PHYSICAL DISTRIBUTION PALLETS

This application is a Continuation of application Ser. No. 08/732,099 filed Oct. 15, 1996.

BACKGROUND OF THE INVENTION

1. Field of the Invention

The present invention relates to a transportation control system or a system for controlling physical distribution pallets used in wide area physical distribution, and in particular to a system for controlling physical distribution pallets, by which it is possible to adjust arrangement of pallets at each physical distribution base to facilitate smooth physical distribution and to set up a forwarding plan to match the reality or to provide detailed control information.

2. Description of the Related Art

To control mobile objects or articles in facilities, a technique has been known in the past, in which a transponding card, i.e. an IC card provided with wireless transmission and receiving functions is mounted on the mobile object or the article, and information such as position information issued by the transponding card is collected at a center to identify the position of the mobile object or the presence of the object (Japanese Patent Publications 5-35934 and 5-67091).

Also, as the technique relating to setting-up of forwarding plan of transport container, the methods have been proposed for distribution plan of sea-borne containers "Imai, A. et al.: "A Study on the Short Period Planning for the Distribution of Empty Sea-borne Containers", Navigation Association of Japan, No.81, pp.1–8, 1989) or for the forwarding plan of railroad containers (Fukumura, N.: Planning for Forwarding of Empty Containers, Using a Mathematical Programming Method", RTRI Report, Vol. 8, No.2, pp.39–44, 1992).

For pallets, which are transport containers in wide area distribution, it is necessary for maintaining smooth physical distribution to identify quantity of pallets in stock at each physical distribution base and to keep sufficient quantity of pallets to match the transport quantity of the articles. At present, stock control of this type of pallets is carried out by human power.

On the other hand, various types of systems to set up transport planning of freight and containers have been conceived under computer-aided design. A system for setting up transport planning through interactive transaction with users is proposed in Japanese Patent Publication Laid-Open 62-1070. Japanese Patent Publication Laid-Open 6-259411 discloses a system of agent model, in which a plurality of processing modules are provided to set up transport planning of objects to be transported in each transport medium, and transport schedule is prepared through information exchange between the modules.

In the physical distribution field, a new mode of freight transportation is increasingly introduced in recent years, which uses pallets to facilitate the execution of loading and unloading operation. The pallets are carried to various places all over the country with cargoes placed on them. After unloading the cargoes, the pallets are sent to the other places with new cargoes placed on them. However, freight transportation is usually one-way transportation from a place of supply to a place of demand, and good balance is not always kept in transportation quantity between these areas. As a result, there are a lot of empty pallets stagnated at a distribution base, while pallets for loading cargoes are in shortage in another distribution base. For this reason, it is necessary to constantly control the stock of pallets and to send empty pallets from an area where pallets are in excess to an area where pallets are in shortage.

The sending of empty pallets may be too late if it is carried out after finding out that pallets are in shortage. The needed quantity of pallets must be transported in advance. It is necessary to predict freight transport quantity at each physical distribution base so that no inconvenience or trouble occurs in freight transportation. Also, the best route of transportation must be selected to reduce the cost for such transportation.

There are the following references discussing the transportation of containers and pallets: Kojima, K. et al.: "The Building of a Simulation System for Prediction of the Number of Necessary Pallets", Kato, S. et al.: "A Study on Pallet Transportation Problem" (50th National Conference of Information Processing Society), or Fukumura: "Planning the Forwarding of Empty Containers, Using a Mathematical Programming Method", (RTRI Report, Vol.8, No. 2, February 1994). In the last reference, description is given on a technique to plan the forwarding of empty containers, based on a mathematical programming method using model.

In the conventional methods, however, it is not possible to solve the problems related to the control of pallets in wide area physical distribution as described below. In the wide area physical distribution, there are tremendous quantity of pallets in distribution, and it is also very difficult to uniformly perform stock control of these pallets at high accuracy because the pallets are to be distributed all over the country.

Even if a pallet is present, it cannot be utilized immediately for transportation of freight unless it is empty. In the conventional method, it is not possible to automatically identify whether the pallets are empty or not. In wide area physical distribution, it is difficult to accurately predict supply and demand of pallets used for transportation. This is because the forwarding business is to forward freight at the request of each customer, and it is difficult to predict the quantity of freight to be forwarded. The differences in areas or seasonal variations also exert extensive influence on supply and demand of pallets.

When a number of empty pallets are present far away from an area where pallets are wanted, it is necessary to forward the empty pallets and to optimize the arrangement of pallets at each distribution base, but it takes high cost for forwarding because the range of forwarding covers the whole country. It is an important problem to set up a forwarding plan to minimize the forwarding cost. The forwarding of empty pallets may be too late if it is carried out after finding out that the empty pallets are in shortage. It is also important which route of transportation should be used to optimize the forwarding of empty pallets to the destination.

When it is actually attempted to set up a plan for forwarding empty pallets, such plan must be considered in view of distribution bases all over the country. Unlike the case where a model is used, the scale of calculation is very extensive, and the tine of calculation also increases.

In the pallet control as it is carried out, very elaborate control is required, i.e. to accurately identify actual status of pallets, and to estimate demand on pallets in very short time span. Based on the results, the schedule of forwarding or the time of departure and arrival must be set up, or adequate standard for pallets in stock must be determined. To set up the plan to forward pallets, full consideration must be given on the mode of transportation of the distribution or on forwarding companies and customs and practice in the forwarding business.

SUMMARY OF THE INVENTION

To solve the above problems, it is a first object of the present invention to provide a system for controlling physical distribution pallets, by which it is possible to accurately identify the status of pallets, to set up an adequate plan for forwarding pallets and to carry out physical distribution in smooth manner.

To attain the first object of the invention, the transport control system for controlling pallets used for transportation of freight in wide area physical distribution comprises transmitting means mounted on the pallets and for storing and transmitting pallet control information of the pallets in wireless, wireless detecting means for detecting the pallet control information transmitted from the transmitting means, pallet stock data storage means for receiving and storing the pallet control information detected by the wireless detecting means via a wide area communication network, and pallet status judging means for judging whether the pallet stored by the pallet stock data storage means is empty or not based on the pallet control information for that particular pallet.

A preferred aspect of the present invention comprises supply and demand predicting means for predicting supply and demand of pallets at physical distribution bases and forwarding plan setting means for setting up a forwarding plan to forward pallets between a plurality of distribution bases where pallets are in excess and a plurality of distribution bases where pallets are in shortage at minimum cost. This makes it possible to accurately identify conditions of the pallets, to set up adequate forwarding plan of pallets and to accomplish smooth physical distribution.

Further, to solve the problems for forwarding pallets as described above, it is a second object of the present invention to provide a system for controlling physical distribution pallets, by which it is possible to elaborately control stock quantity of the pallets and to set up a realistic forwarding plan of the pallets.

To attain the second object of the invention, the system for controlling physical distribution pallets according to the present invention comprises a user interface for accepting requests of users and for displaying the pallet forwarding plan thus set up, a wireless tag device for automatically acquiring information relating to arrival and departure of pallets, accumulating means for accumulating information of the pallets acquired and information on the pallet forwarding plan, and a system main unit for reading the information of the accumulating means and setting up pallet forwarding plan as requested by the user, whereby the system main unit is provided with various types of forwarding plan setting means and simulating means for reading information of the accumulating means to cope with diversified requirements of the users.

As a result, it is possible to achieve reliable stock control of the pallets in actual wide area physical distribution, to set up the forwarding plan, and to efficiently carry out the physical distribution control.

The invention according to claim 1 provides a transport control system for controlling pallets used in transport of freight in wide area distribution, and the system comprises transmitting means mounted on each of pallets and for storing and transmitting pallet control information of the pallets in wireless, wireless detecting means for detecting pallet control information transmitted from the transmitting means, pallet stock data storage means for receiving and storing the pallet control information detected by the wireless detecting means via a wide area communication network, and pallet status judging means for judging whether the pallet stored in the pallet stock data storage means is empty or not based on the pallet control information of the pallet, whereby it is possible to accurately identify the number of a tremendous quantity of pallets distributed all over the country, position of each pallet and whether it is empty or not, and to uniformly control stock status of the pallets. It is also possible to decrease the number of personnel to be assigned for stock control of the pallets.

In the invention according to claim 2, the pallet status judging means judges that a pallet is empty when the pallet is not stored in the pallet stock data storage means and also when a predetermined standard time required for unloading of a freight has elapsed from the time detected by the wireless detecting means.

The pallet control information is detected by the wireless detecting means when a pallet arrives at and departs from a physical distribution base. For this reason, a record at the arrival is kept in the pallet stock data storage means for the pallet, which leaves a physical distribution base. In contrast, when a pallet arrives at the physical distribution base, the record of the pallet is not present in the pallet stock data storage means. Therefore, if the record of the pallet, for which the pallet control information has been set, is not found in the pallet stock data storage means, it is regarded that the pallet has arrived at the physical distribution base. In this case, if a predetermined standard time for unloading the freight has elapsed after the arrival, it is judged that the pallet is empty.

In the invention according to claim 3, the system comprises transport schedule storage means for storing information relating to schedule of transport means and supply and demand predicting means for predicting supply and demand of pallets at a physical distribution base according to the information stored in the transport schedule storage means and the quantity of pallets in empty state at the physical distribution base, whereby it is predicted whether it is possible or not to cover the quantity of pallets needed for transport by empty pallets currently present at the physical distribution base.

In the invention according to claim 4, the supply and demand predicting means predicts whether the pallets at physical distribution base is in excess or in shortage based on the difference between the quantity of pallets to arrive by transport means and the quantity of pallets to leave and also on the current quantity of pallets in empty state, whereby the quantity of pallets needed at the physical distribution base can be quantitatively predicted.

In the invention according to claim 5, the supply and demand predicting means compensates the predicted quantity of pallets in excess or in shortage based on knowledge or constraint condition relating to supply and demand of pallets, and it is possible to increase accuracy of the predicted value.

In the invention according to claim 6, there is provided forwarding plan setting means for setting up forwarding plan of pallets between physical distribution bases according to the supply and demand predicting data of the pallets obtained by the supply and demand predicting means and knowledge or constraint condition on supply and demand of the pallets, whereby it is possible to set up forwarding plan of the pallets, which can generally correct shortage or excess of the pallets at each physical distribution base and also to reduce the number of personnel to be assigned for setting up the forwarding plan.

In the invention according to claim 7, the forwarding plan setting means sets up forwarding destination, forwarding quantity and time of forwarding to minimize the forwarding cost between a plurality of distribution bases where pallets are in excess and a plurality of distribution bases where pallets are in shortage, whereby it is possible to minimize the cost needed for the forwarding of the pallets.

The invention according to claim 8 comprises a transport network storage means for hierarchically arranging and storing information relating to transport network, which hierarchically connects physical distribution bases, and the forwarding plan setting means uses the data stored in the transport network storage means when setting up the forwarding plan of the pallets, and it is possible to set up a forwarding plan for the pallets suitable for transport network in wide area physical distribution.

In the invention according to claim 9, transport network storage means classifies the data relating to the transport network to major transfer bases, general transfer bases and collection and delivery bases and stores hierarchically based on function of the physical distribution bases, whereby it is possible to set up a forwarding plan of pallets suitable for transport network having hierarchical structure in wide area physical. distribution.

In the invention according to claim 10, there are provided map storage means for storing road maps and route searching means for searching an optimal transport route to the forwarding destination of a pallet based on the pallet forwarding plan data set up by the forwarding plan setting means and the data of the map storage means, whereby it is possible to indicate an optimal transport route to the forwarding destination even when a driver in charge of transporting empty pallets does not have good knowledge about the forwarding destination.

In the invention according to claim 11, there is provided a system for controlling physical distribution pallets for controlling stock of pallets in wide area physical distribution and for setting up a pallet forwarding plan, and the system comprises a user interface for accepting request of users and for indicating a pallet forwarding plan thus set up, a wireless tag device for automatically acquiring information relating to arrival and departure of pallets, accumulating means for accumulating information of the acquired pallet and information of the pallet forwarding plan, and a system main unit for reading the information of the accumulating means and for setting up the pallet forwarding plan as requested by the users, whereby it is possible to set up diversified pallet forwarding plans as requested by the users and to present the plans to the users based on pallet control information automatically collected.

In the invention according to claim 12, the system main unit comprises high-speed setting means for setting up a forwarding plan to forward pallets to physical distribution bases where pallets are in shortage with priority on a distribution base which requires lower transport cost between distribution bases among the distribution bases where pallets are in excess, and it is possible to quickly set up the pallet forwarding plan based on simple rules.

In the invention according to claim 13, the system main unit comprises forwarding service judging means for judging number of pallet forwarding services and number of the forwarded pallets between physical distribution bases using linear programming method, whereby it is possible to set up detailed forwarding plan to connect a multiple of physical distribution bases.

In the invention according to claim 14, the system main unit comprises pallet quantity predicting means for analyzing time series data of quantity of pallets at each physical distribution base and for obtaining a function approximating the data as predicted data of quantity of pallets, whereby it is possible to indicate transition of the quantity of pallets at each physical distribution base.

In the invention according to claim 15, the system main unit comprises result feedback means for obtaining pallet forwarding plan to eliminate the difference between actual value and planned value of pallet quantity at each physical distribution base using linear programming method, whereby it is possible to set up a pallet forwarding plan based on the actual results.

In the invention according to claim 16, the system main unit comprises schedule interval judgment supporting means for preparing pallet forwarding plan based on the specified delivery schedule of the forwarded pallet, whereby it is possible to simulate the condition, under which the delivery schedule of the forwarded pallets has been changed.

In the invention according to claim 17, the system main unit comprises forwarding schedule interval automatic judging means for automatically judging delivery interval of the forwarded pallets using the schedule interval judgment supporting means, whereby it is possible to automatically set optimal delivery interval date of the forwarded pallets.

In the invention according to claim 18, the system main unit comprises standard stock quantity judgment supporting means for calculating standard stock quantity of pallets at physical distribution bases according to maximum and minimum values of the quantity of pallets varying in terms of time at each distribution base, whereby it is possible to indicate the quantity of pallets to be prepared at each physical distribution base.

In the invention according to claim 19, the system main unit comprises standard stock quantity automatic judging means for indicating pallet forwarding plan in case standard stock quantity of pallets at physical distribution bases is specified using the standard stock quantity judgment supporting means and the schedule interval judgment supporting means, whereby the user can find how the pallets are forwarded in case the standard stock quantity at the physical distribution base has been changed.

In the invention according to claim 20, the system main unit comprises hierarchical planning means for hierarchically setting up the plan by dividing the physical distribution bases to those between districts and those within a district and by sorting the pallet forwarding plan to a plan between districts and a plan within a district, whereby it is possible to set up a pallet forwarding plan to cope with physical distribution network.

In the invention according to claim 21, the system main unit comprises actual result data automatic collecting means for converting information obtained from the wireless tag device to pallet control information, whereby it is possible to convert the actual status of pallets to data.

In the invention according to claim 22, the wireless tag device is designed in such manner that place of departure and place of arrival of pallets and time of departure and time of arrival are inputted to actual result data automatic collecting means, whereby it is possible to input immediate information of pallets.

BRIEF DESCRIPTION OF THE DRAWINGS

These objects and features of the present invention will become more readily apparent from the following detailed description of the preferred embodiments taken in conjunction with the accompanying drawings in which:

FIG. 2 represents tables showing examples of memory content in a pallet stock storage area in the above system for controlling physical distribution pallets;

FIG. 4 represents a table showing an example of memory content in a transport schedule storage area in the above system for controlling physical distribution pallets;

FIG. 5 represents tables showing examples of memory contents of knowledge storage area in the above system for controlling physical distribution pallets;

FIG. 6 is a flow chart of a processing procedure of supply and demand predicting means in the above system for controlling physical distribution pallets;

FIG. 8 shows examples of memory contents in transport network storage areas in the above system for controlling physical distribution pallets;

FIGS. 12A, 12B and 12C each represents an example of memory content in a map storage area in the above system for controlling physical distribution pallets;

FIG. 27 represents data on transport costs between physical distribution bases;

FIG. 28 represents data of pallets in excess or in shortage between physical distribution bases;

FIG. 29 represents data of pallets in excess or in shortage at each of physical distribution bases;

FIG. 30 represents data of transport costs between physical distribution bases;

FIG. 31 represents data of a supply and demand table;

FIG. 32 represents input equations to linear programming means;

FIG. 33 represents output equations to linear programming means;

FIG. 34 represents data obtained by converting output of the linear programming means;

FIG. 35 represents pallet data at Asahikawa;

FIG. 36 represents complementary difference at each of the physical distribution bases;

FIG. 37 represents data of pallets in excess or in shortage between the physical distribution bases;

FIG. 38 represents a supply and demand table between the physical distribution bases;

FIG. 39 represents input equations of linear programming means;

FIG. 40 represents output equations of linear programming means;

FIG. 41 represents quantity of pallets at every hour at a physical distribution base;

FIG. 42 is a table showing standard stock quantity and excess or shortage data between the physical distribution bases;

FIG. 43 represents a timetable of transport services;

FIG. 44 shows default values of standard stock quantity;

FIG. 45 represents excess or shortage data with the standard stock quantity as a variable;

FIG. 46 represents data after change of the excess and shortage data;

FIG. 47 represents data in each of delivery districts;

FIG. 48 represents data for each delivery district; and

FIG. 49 represents actual result data from the wireless tag.

DETAILED DESCRIPTION OF THE INVENTION

Figure 1:
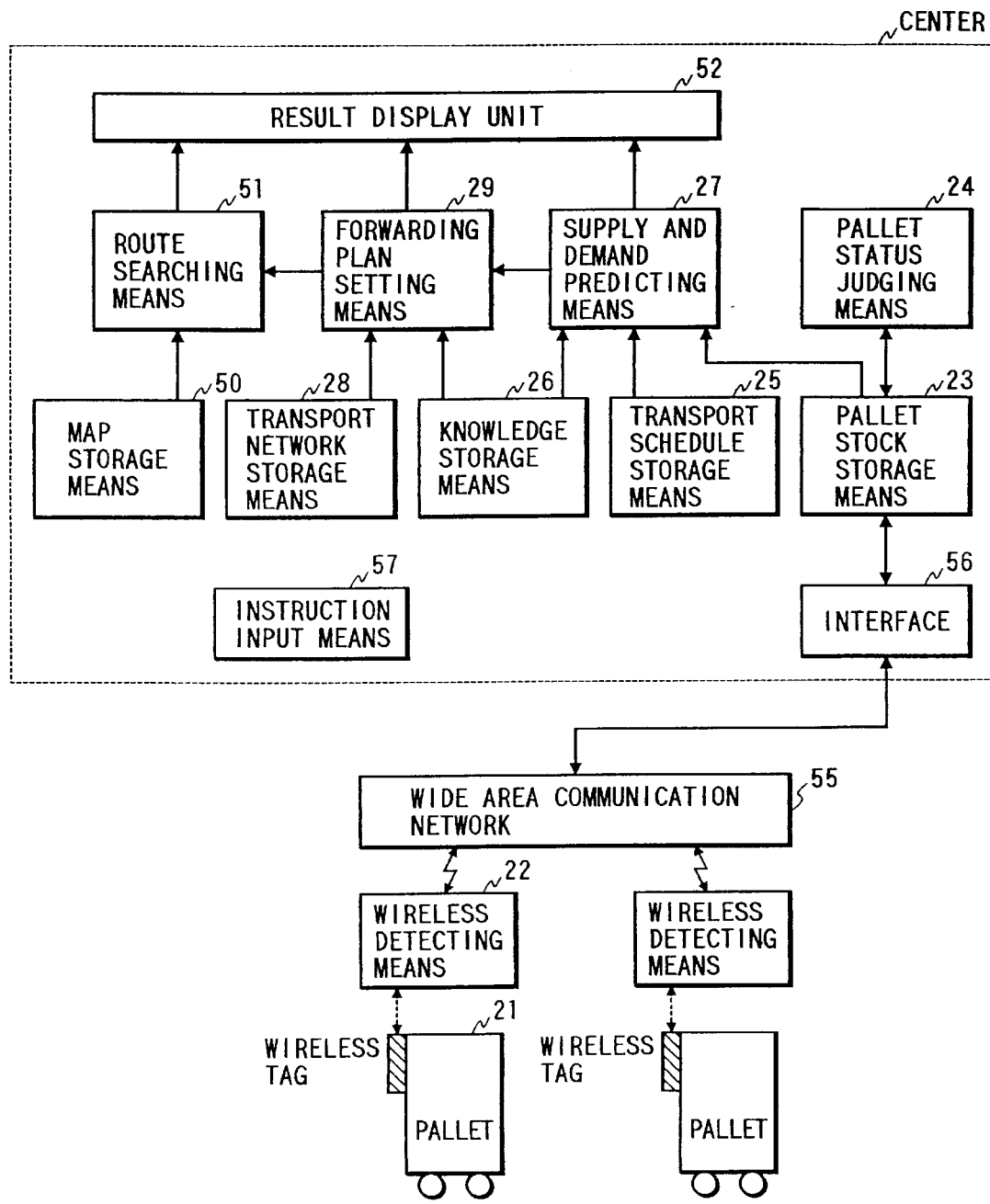
FIG. 1 is a block diagram of a first embodiment of a system for controlling physical distribution pallets according to the present invention.

In the following, description will be given on the preferred embodiments of a system for controlling physical distribution pallets of the present invention referring to the drawings.

[1st Embodiment]

FIG. 1 is a block diagram showing a first embodiment of a system for controlling physical distribution pallets of the present invention. As shown in FIG. 1, this system for controlling physical distribution pallets can communicate with a wireless tag 21, which is mounted on each pallet and stores and transmits pallet control information for individually controlling the pallets. The system for controlling physical distribution pallets shown in FIG. 1 comprises wireless detecting means 22 for reading and writing pallet control information in wireless from or to the wireless tag 21, pallet stock storage means 23 for collecting and storing pallet control information obtained by the wireless detecting means 22 via a wide area communication network 55 and an interface 56 connected thereto, pallet status judging means 24 for judging whether a pallet is empty or not from the pallet control information, transport schedule storage means 25 for storing information relating to schedule of transport services, knowledge storage means 26 for storing knowledge and constraint condition relating to supply and demand of pallets, supply and demand predicting means 27 for predicting supply and demand of pallets for each physical distribution base according to the pallet supply and demand data stored in the pallet stock storage means 23, schedule data stored in the transport schedule storage means 25, and data stored in the knowledge storage means 26, transport network storage means 28 for hierarchically arranging and storing information relating to transport network, which connects the physical distribution bases, forwarding plan setting means 29 for setting up pallet forwarding plan between the physical distribution bases from the pallet supply and demand predicting data outputted from the supply and demand predicting means 27, the data stored in the knowledge storage means 26, and the data stored in the transport network storage means 28, map storage means 50 for storing road maps, route searching means 51 for searching an optimal transport route to the forwarding destination from the pallet forwarding plan data outputted by the forwarding plan setting means 29 and the map data stored in the map storage means 50, and a result display unit 52 for displaying the results obtained by the means 27, 29 and 51. Further, there is provided instruction input means 57 for inputting and giving instructions from the user to each of these means.

The wireless tag 21 mounted on each pallet consists of an IC card provided with transmitting and receiving functions. It stores pallet control information such as pallet ID for individually identifying the pallets and transmits the stored pallet control information at the request to read from the wireless detecting means 22.

The wireless detecting means 22 is installed at each physical distribution base, reads pallet control information from the wireless tag 21 of a pallet to arrive or to depart, and transmits the pallet control information together with position information indicating the physical distribution base where the wireless detecting means 22 is installed and also with the information on the detecting time to a center via a wide area communication network 55. Here, the physical distribution bases mean major transfer bases (physical distribution centers) shown in FIGS. 8 and 9 and general transfer bases (business offices) organized under the major transfer bases. Each of these physical distribution bases has parking space for trucks, which transport pallets and articles or products accommodated on the pallets. When the truck arrives at the physical distribution base, the loaded pallets are unloaded from the truck, the truck passes through a predetermined gate. An antenna (not shown) of the wireless detecting means 22 is mounted on each gate or nearby, and when the pallet passes through the gate, communication is performed between the wireless detecting means 22 and the wireless tag 21.

The wide area communication network 55 is a network to concentrate information from the wireless detecting means 22 located at all physical distribution bases covered by the present system via a special-purpose line or via cable communication means such as public line. The wide area communication network 55 is connected to the pallet stock storage means 23 via the interface 56. Except the wireless detecting means 22, each of the means 23 to 29, 50 and 51 shown in FIG. 1 comprises a central processing unit (CPU) (not shown), memory such as ROM and/or RAM and an external storage unit. If necessary, a digital signal processor (DSP) may be used. The result display unit 52 is provided with a CRT, a liquid crystal monitor and a drive unit. In FIG. 1, the components enclosed by dotted line is provided at the center. These means may be a personal computer or a work station, comprising 32-bit CPU with clock frequency of 100 MHz.

As shown in FIG. 2, the pallet stock storage means 23 accommodates a pallet movement control table comprising a pallet ID field to describe ID of each pallet, a position information field to describe position of a pallet, a detection time field to describe the time when pallet control information is received from the wireless tag, and a pallet status field to describe status of each pallet, and an empty pallet stock table comprising a physical distribution base field to describe the physical distribution base, an empty pallet standard stock quantity field to describe standard stock quantity of empty pallets at the physical distribution base, and an empty pallet current quantity field to describe current quantity of the empty pallets. The current quantity of empty pallets in the empty pallet stock table is calculated from the data of the pallet status field of the pallet movement control table.

Figure 3:
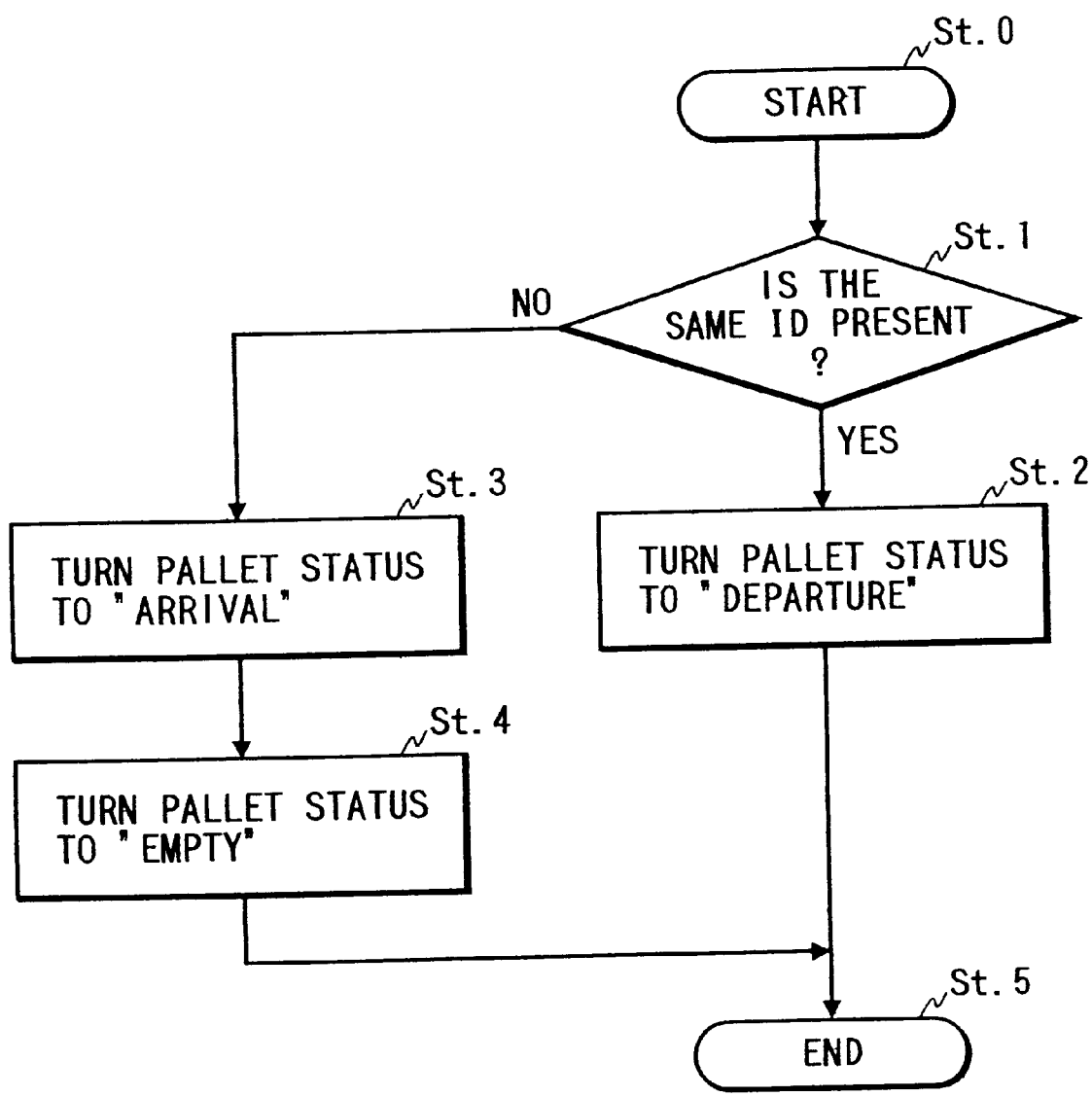
FIG. 3 is a flow chart showing a processing procedure of pallet status judging means in the above system for controlling physical distribution pallets.

The pallet status judging means 24 prepares the data of the pallet status field of the pallet movement control table based on the detection time of the pallet movement control table stored in the pallet stock storage means 23 by the procedure of the flow chart shown in FIG. 3.

In Step 0, the pallet control information detected by the wireless detecting means 22 is received via the wide area communication network. When it is stored in the pallet stock storage means 23, the pallet status judging means 24 is started.

In Step 1, the pallet status judging means 24 judges whether the same pallet ID as the pallet ID to be written newly is already present in the pallet movement control table. If it is present, the status of the pallet to be newly written is determined as "departure" in Step 2. This is written to the pallet movement control table, and the processing is completed in Step 5. (The data of the pallet in "departure" status is erased from the pallet movement control table after a predetermined time has elapsed.)

If the same pallet ID as the pallet ID to be newly written is not present in the pallet movement control table in Step 3, the status of the pallet to be written newly is determined as "arrival". This is written in the pallet movement control table. For the pallet, which has been determined as in "arrival" status in Step 4, the status is determined as "empty" after the standard time required for unloading of freight has elapsed. This value is written in the pallet movement control table, and processing is completed in Step 5.

The system may also be designed in such manner that pallet position information showing the present position of the pallet or time information showing time of departure or arrival of the pallet is written by a wireless device, and the information written on the wireless tag 21 or pallet ID information may be read by the wireless detecting means 22 installed at another position.

As shown in FIG. 4, the transport schedule storage means 25 accommodates a transport schedule table, which comprises a transport service name field, a transport departure place field, a transport arrival place field, a departure time field, an arrival time field, and an average loaded pallet quantity field.

As shown in FIG. 5, a transport knowledge table where transport knowledge is to be described and a constraint table where constraint rule is to be described are accommodated in the knowledge storage means 26, and each of these tables comprises a rule number field, a condition unit field, and an execution unit field.

The supply and demand predicting means 27 refers to the data of the pallet stock storage means 3, the transport schedule storage means 25, and the knowledge storage means 26 at the time when inventory of pallet stock as determined in advance is performed, and predicts supply and demand of pallets based on that time by the procedure shown in FIG. 6. The results are displayed on the result display unit 52.

When started in Step 6, the supply and demand predicting means 7 selects physical distribution base one each from the empty pallet stock table in the pallet stock storage means 23 in Step 7. In Step 8, using the transport schedule table of the transport schedule storage means 25, all of the average quantities of loaded pallets on the record where the name of the physical distribution base selected in Step 7 is the same as the value at the place of arrival are added, and the predicted quantity of pallets expected to arrive at the physical distribution base is obtained. In Step 9, all of the average quantities of loaded pallets on the record where the name of physical distribution base selected in Step 7 is the same as the value at the place of departure of the transport schedule table are added, and the predicted quantity of pallets expected to depart at that distribution base is obtained. In Step 10, the predicted quantity of pallets to depart as obtained in Step 9 is subtracted from the predicted quantity of pallets to arrive as obtained in Step 8, and the predicted quantity of the pallets required on the next day is obtained. In Step 11, the current quantity of empty pallets is subtracted from the standard stock quantity of empty pallets in the empty pallet stock table of the pallet stock storage means 3, and the current quantity of pallets in excess or in shortage at the distribution base selected in Step 7 is obtained. In Step 12, the predicted quantity of pallets needed on the next day as obtained in Step 10 is subtracted from the current quantity of pallets in excess or in shortage as obtained in Step 11, and the quantity of pallets in excess or in shortage at the standard time (e.g. 15:00) is obtained. In Step 13, referring to the data in the transport knowledge table of the knowledge storage means 6, the quantity of pallets in excess or in shortage on the next day as obtained in Step 12 is corrected when necessary.

Figure 7:
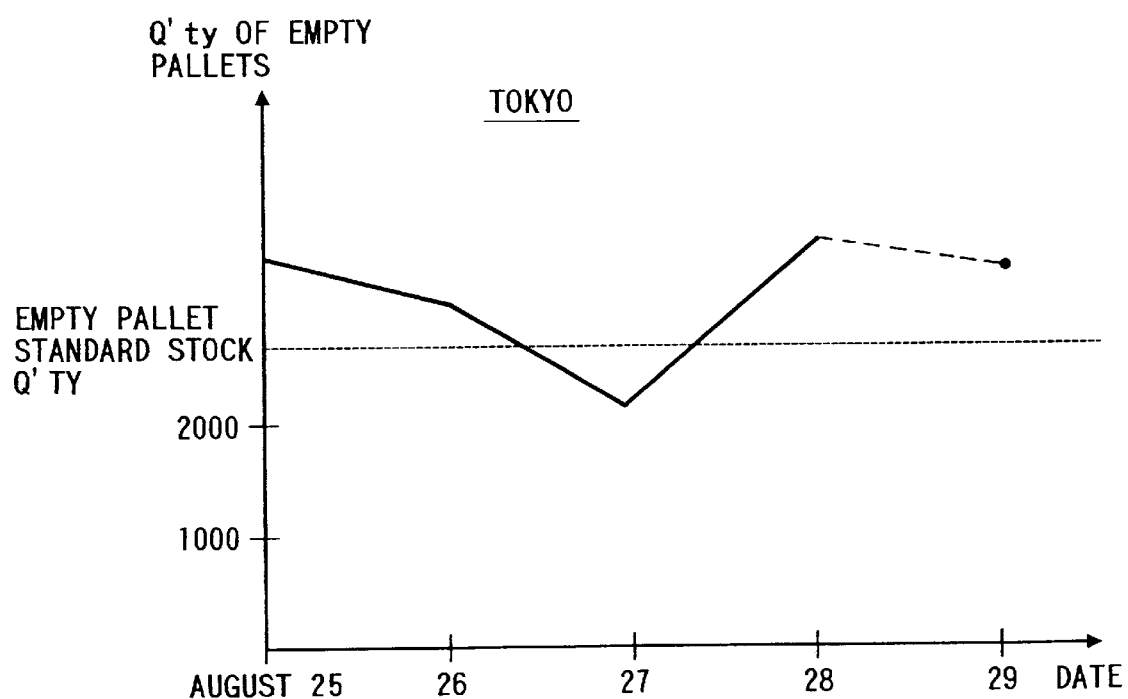
FIG. 7 is a diagram showing display mode of the results of supply and demand prediction in the above system for controlling physical distribution pallets.

In Step 14, it is checked whether there is a physical distribution base, for which supply and demand prediction has not been performed, in the empty pallet stock table of the pallet stock storage means 3. If there is, the processing should be repeated from Step 7. If not, the results of supply and demand prediction for each physical distribution base are displayed in Step 15 by dotted line and black spot being continuous to the past results in FIG. 7 (In FIG. 7, the difference from the standard stock quantity of empty pallets indicates the quantity of pallets in excess or in shortage on the next day.), and the processing is completed in Step 16.

Figure 9:
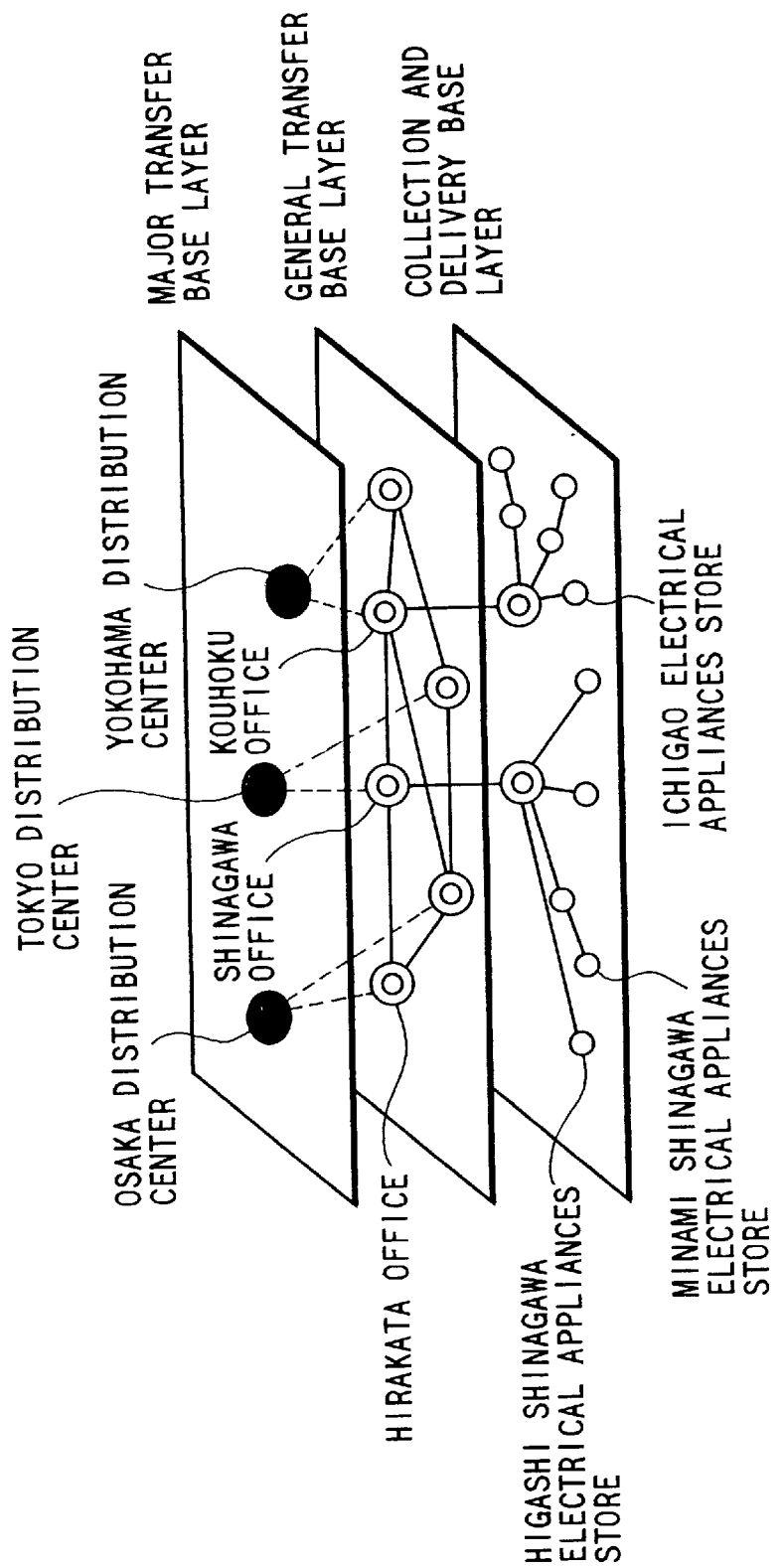
FIG. 9 is an image drawing to show hierarchical structure of the transport network storage area of the above system for controlling physical distribution pallets.

The transport network storage means 28 accommodates a major transfer base layer table comprising a major transfer base name field and a subordinate base, a general transfer base table comprising a superior base field and a subordinate base field, and a collection and delivery base table comprising a collection and delivery base name field and a superior base name field. Each of the major transfer base name, the general transfer base name and the collection and delivery base name corresponds to a node as an element to constitute the transport network. (This is called "transport node" to discriminate from the node to indicate road.) When taking notice of the difference of physical distribution functions, this can be classified into three categories. Major transfer base (main hub) is a base having transfer function of physical distribution in a wide area (e.g. on prefecture level). General transfer base (hub), which has no collection and delivery function to customers is a base having transfer function of physical distribution in an area closer to the place of collection and delivery, fractionalizing the wide area, and has no base for collection and delivery to customers. The collection and delivery base (depot) is a base having the function of collection and delivery, receiving orders from customers and delivering or collecting freight to and from customers. These bases have hierarchical structure as shown in FIG. 9. Actual transportation is carried out in such pattern as: Collecting freight from customers ∃ Collection and delivery base (dept) ∃ General transfer base (hub) ∃ Major transfer base (main hub) ∃ General transfer base ∃ Collection and delivery base ∃ Delivery to customers. This takes typical transportation pattern in wide area physical distribution and transportation as commonly seen in mailing and express delivery service.

Figure 10:
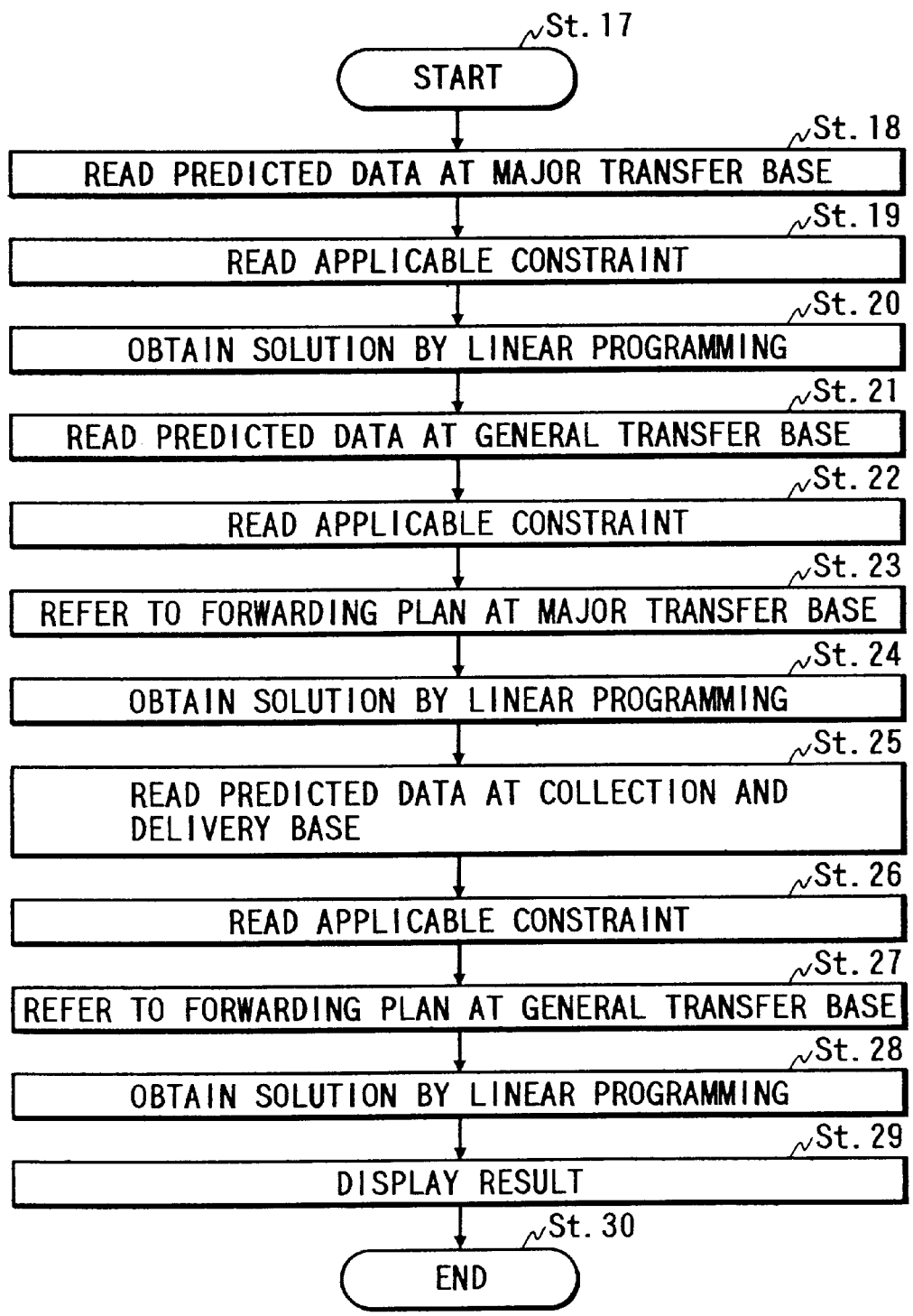
FIG. 10 is a flow chart of a processing procedure of forwarding plan setting means in the above system for controlling physical distribution pallets.

The forwarding plan setting means 29 sets up an optimal forwarding plan of pallets, i.e. a forwarding plan to minimize the forwarding cost based on the results of the pallet supply and demand prediction by the procedure shown in FIG. 10, referring to the data of the knowledge storage means 26, the supply and demand predicting means 27, and the transport network storage means 28. The results are displayed on the result display unit 52. Here, the empty pallet forwarding plan means a plan to obtain number of transport vehicles, transport schedule and route in case empty pallets are transported (forwarded) to the physical distribution base where pallets are in shortage from the physical distribution base where pallets are in excess based on the quantity of pallets in excess or in shortage at each physical distribution base detected as the results of supply and demand prediction.

When started in Step 17, the forwarding plan setting means 29 reads the pallet supply and demand prediction data at the physical distribution bases classified as major transfer base layer by the transport network storage means 28 in Step 18 and kept in memory from the supply and demand predicting means 27. In Step 19, the constraint is read from the constraint table of the knowledge storage means 26. In Step 20, this is formulated as a problem of linear programming in the mathematical programming method based on the pallet supply and demand prediction data read in Step 18 and the constraint read in Step 19, and the optimal solution to minimize the pallet forwarding cost is obtained. Specifically, it is determined how many pallets should be forwarded from which of the major transfer bases where empty pallets are in excess to the major transfer base where pallets are in shortage.

Next, in Step 21, the pallets supply and demand prediction data of the physical distribution base classified and stored as general transfer base layer in the transport network storage means 28 is read from the supply and demand predicting means 27. In Step 22, the applicable constraint is read from the constraint table of the knowledge storage means 26. In Step 23, the pallet supply and demand data at each physical distribution base as obtained as the result of the forwarding plan at the major transfer base layer obtained in Step 19 is referred. If there are major transfer bases where pallets are in shortage, these are added as the object of the forwarding plan of general transfer base layer and are expressed as constraint. In Step 24, this is formulated as linear programming problem based on the pallet supply and demand prediction data as read in Step 21 and on the constraint read in Steps 22 and 23, and the optimal solution to minimize the forwarding cost is obtained. Specifically, it is determined how many pallets should be forwarded from the general transfer bases where empty pallets are in excess to general transfer bases where pallets are in shortage. If there are bases where the problem of excess of shortage is not yet solved in the major transfer base layer, this is considered as an object for forwarding.

Next, in Step 25, the pallet supply and demand prediction data of the physical distribution bases, classified and stored as collection and delivery base layer in the transport network storage means 28, is read from the supply and demand predicting means 27. In Step 26, the applicable constraint is read from the constraint table of the knowledge storage means 26. In Step 27, the forwarding plan in the general transfer base layer as obtained in Step 24 is referred as constraint. In Step 28, this is formulated as linear programming problem based on the pallet supply and demand prediction data as read in Step 25 and on the constraint as read in Steps 26 and 27, and the optimal solution to minimize the forwarding cost is obtained.

Figure 11:
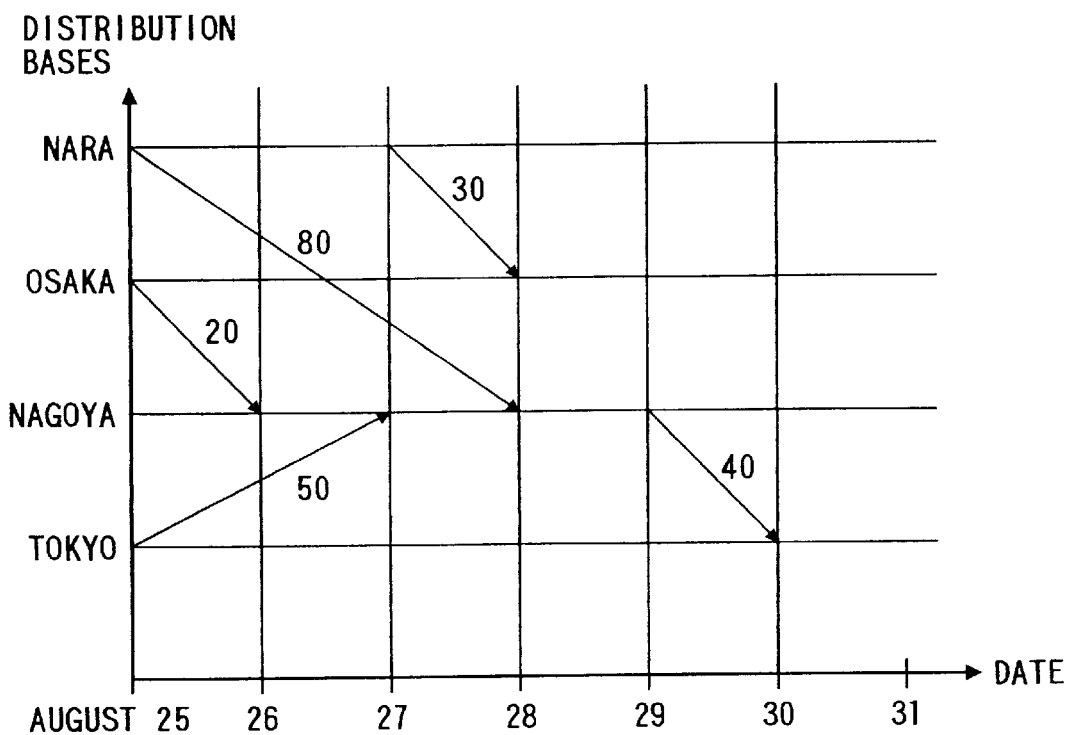
FIG. 11 is a diagram showing display form of the results of forwarding plan set-up in the above system for controlling physical distribution pallets.

In Step 29, the results of the forwarding plan setup is displayed in the result display unit 52 shown in FIG. 11. (In FIG. 11, arrows indicate forwarding departure points and forwarding arrival points, and the number attached to each arrow indicates the quantity of pallets to be forwarded.) In Step 30, processing is completed.

In the map storage means 50, the following two tables are accommodated: a node table comprising a node name field to describe node name of network branch, a longitude field to describe geographical longitude of node, and a latitude field to describe latitude of the node, and an arc table comprising an arc name field to describe route between nodes, a starting point field to describe the node of the starting point of the route, a terminal point field to describe the node of terminal point of the route, and a distance field to describe distance of the route. Further, a transport node correspondence table is accommodated in the map storage means 50 as shown in FIG. 12C. Describing this in detail, major transfer base, general transfer base and collection and delivery base to express nodes of the transport network are called "transportation node" to distinguish them from the node on map. To indicate correspondence between the transport node and the road map, the transport node correspondence table is provided as shown in FIG. 12C.

Figure 13:
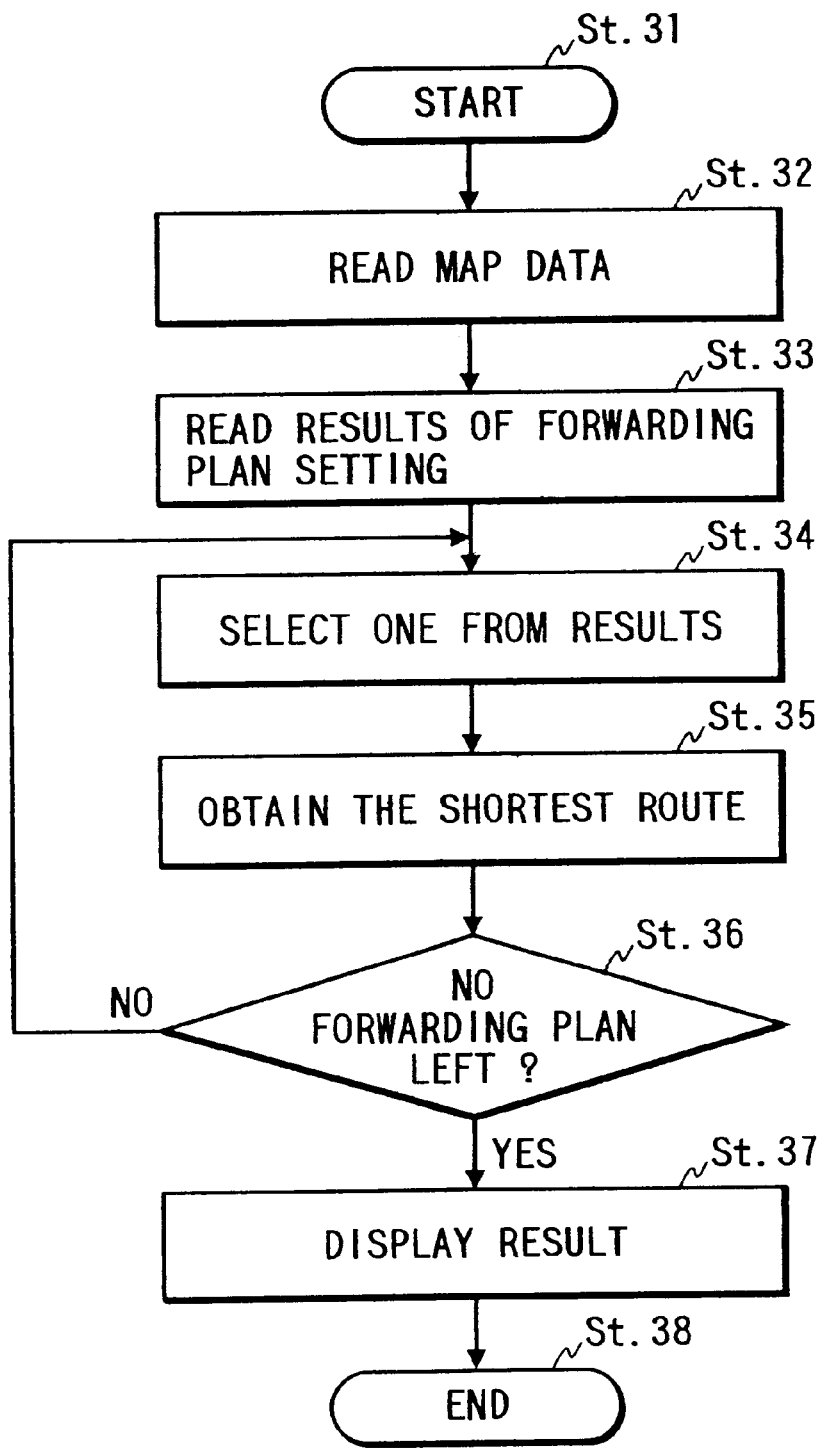
FIG. 13 is a flow chart of a processing procedure of route searching means in the above system for controlling physical distribution pallets.

The route searching means 51 searches a transport route having the shortest distance from the pallet forwarding starting point to the pallet forwarding arrival point by the procedure shown in FIG. 13, referring to the data of the forwarding plan setting means 29 and the map storage means 50. The results are displayed on the result display unit 52.

Figure 14:
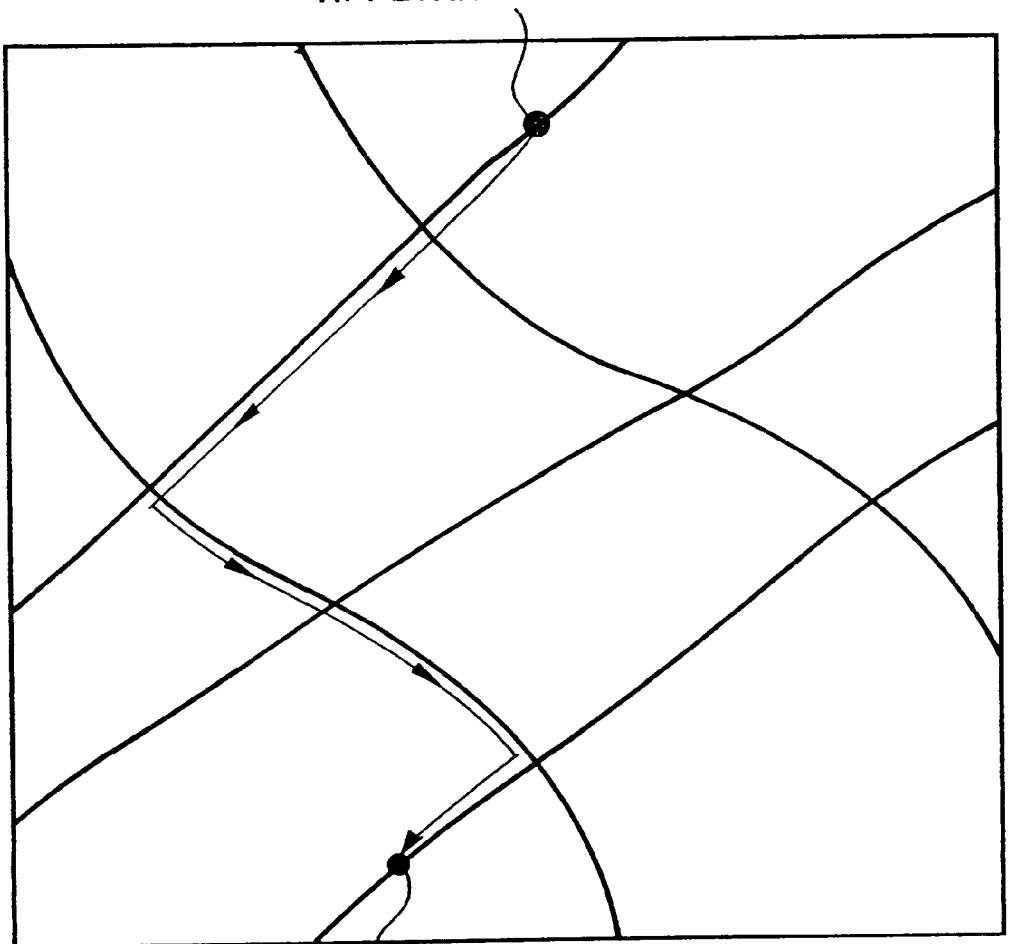
FIG. 14 is a drawing to show display form of the results of route searching in the above system for controlling physical distribution pallets.

When the route searching means 51 is started in Step 31, data is read front the map storage means 50 in Step 32. In Step 33, the forwarding plan setting results are read from the forwarding plan setting means 29. In Step 34, one of the forwarding plan setting results read in Step 33 is selected. In Step 35, the shortest route from the forwarding starting point to the forwarding arrival point is detected referring to the arc table of the map storage means 50. In Step 36, it is checked whether there remains data, for which route searching is not yet performed among the forwarding plan setting results as read in Step 33. If data remains, the processing from Step 34 is repeated. If there is no remaining data, the results of route searching are displayed on the result display unit 52 as shown in FIG. 14 in Step 37, and the processing is completed in Step 38.

[2nd Embodiment]

Figure 15:
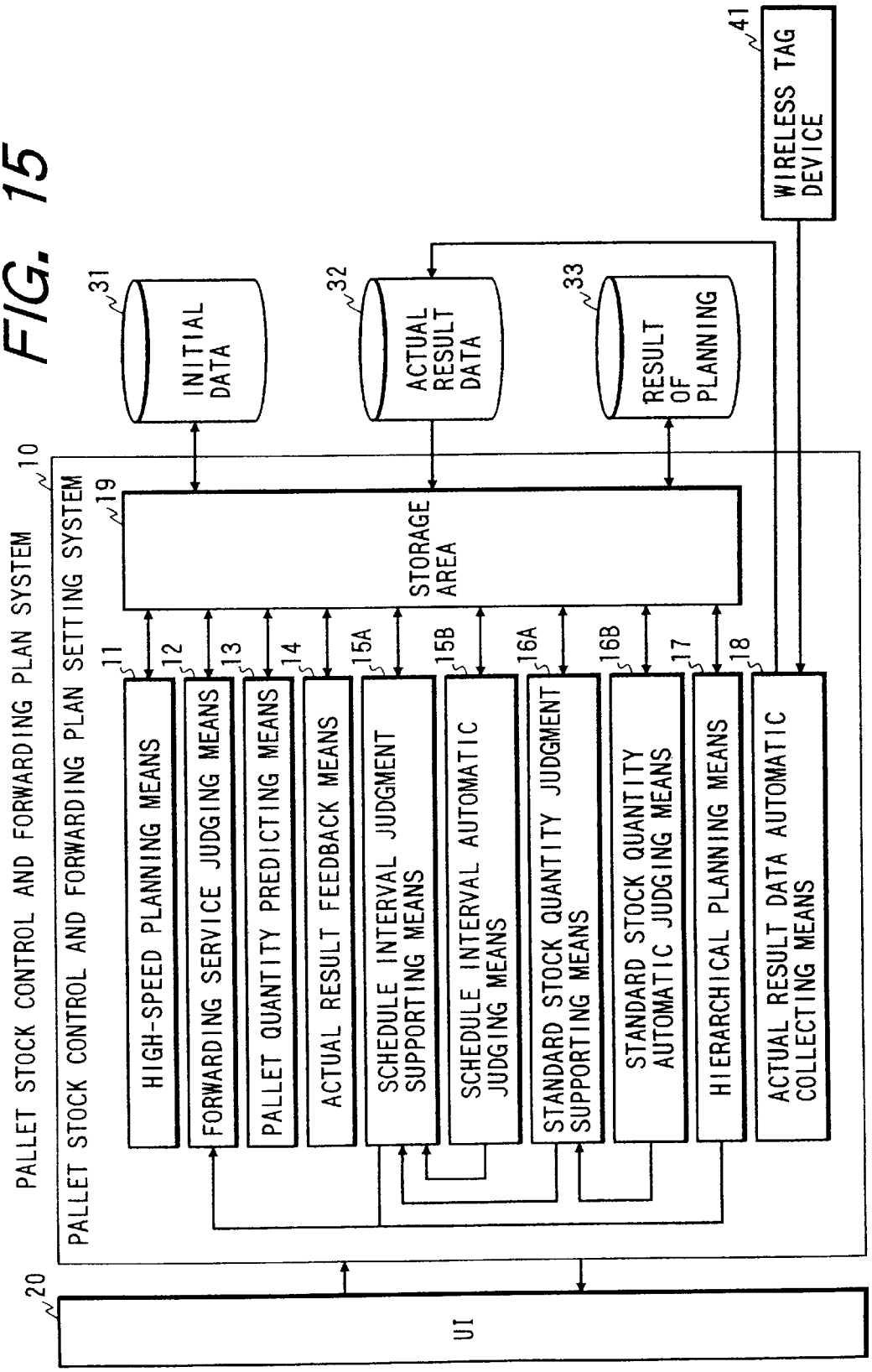
FIG. 15 is a general block diagram of a second embodiment of a system for controlling physical distribution pallets according to the present invention.

As shown in FIG. 15, the second embodiment of the system for controlling physical distribution pallets of the present invention comprises a system main unit 10 for setting up a pallet forwarding plan, a user interface (UI) 20 for accepting requests of users and for displaying the result of planning determined by the system main unit 10, a wireless tag device 41 for automatically acquiring information relating to arrival and departure of pallets to and from stock, a storage unit 31 for storing initial data, a storage unit 32 for storing actual result data showing the current status of the pallets, and a storage unit 33 for storing results of the pallet forwarding plan. In the initial data storage unit 31, initial values such as data of transport services in physical distribution, transport cost between physical distribution bases, pallet standard stock quantity at each physical distribution base, delivery schedule interval of the forwarded pallets, etc. are stored. The wireless tag device 41 corresponds to the wireless detecting means 22 as explained in connection with FIG. 1, and it can communicate with the system main unit via a wide area communication network (not shown). In FIG. 15, the wireless tag is not shown, but each pallet is provided with a wireless tag, which communicate with the wireless detecting means 22 as shown in FIG. 1.

As each of the storage units 31 to 33, a magnetic disk or an opto-magnetic disk unit or RAM my be used. The user interface 20 comprises an operation panel and a monitor unit such as CRT.

The system main unit 10 comprises high-speed planning means 11 for setting up pallet forwarding plan at high speed, forwarding service judging means 12 for judging number of forwarding services of pallets and the quantity of the pallets to be forwarded in detail, pallet quantity predicting means for predicting quantity of pallets at an arbitrary time point at each of the physical distribution bases, actual result feedback means 14 for reflecting the forwarding plan thus set up to the data of pallet supply and demand quantity in the delivery plan on the next delivery day, schedule interval judgment supporting means 15A for simulating the forwarding plan and for supporting judgment of pallet forwarding schedule interval, schedule interval automatic judging means 15B for judging pallet forwarding schedule interval using the schedule interval judgment supporting means 15A, standard stock quantity judgment supporting means 16A for supporting judgment on standard stock quantity at each physical distribution base by simulating the forwarding plan, standard stock quantity judgment supporting means 16B for judging standard stock quantity at each physical distribution base using the standard stock quantity judgment supporting means 16A, hierarchical planning means 17 for setting up hierarchical delivery plan based on hierarchical structure between physical distribution bases, actual result data automatic collecting means 18 for collecting information from the wireless tag device 41, and a storage area 19 used as working area of each of these means. As already explained in connection with FIG. 1, each of the means 11 to 14, 15A, 15B, 16A, 16B, 17, and 18 of the system main unit 10 comprises CPU, memory such as ROM, interface, etc. The storage area 19 comprises memory such as RAM.

Figure 16:
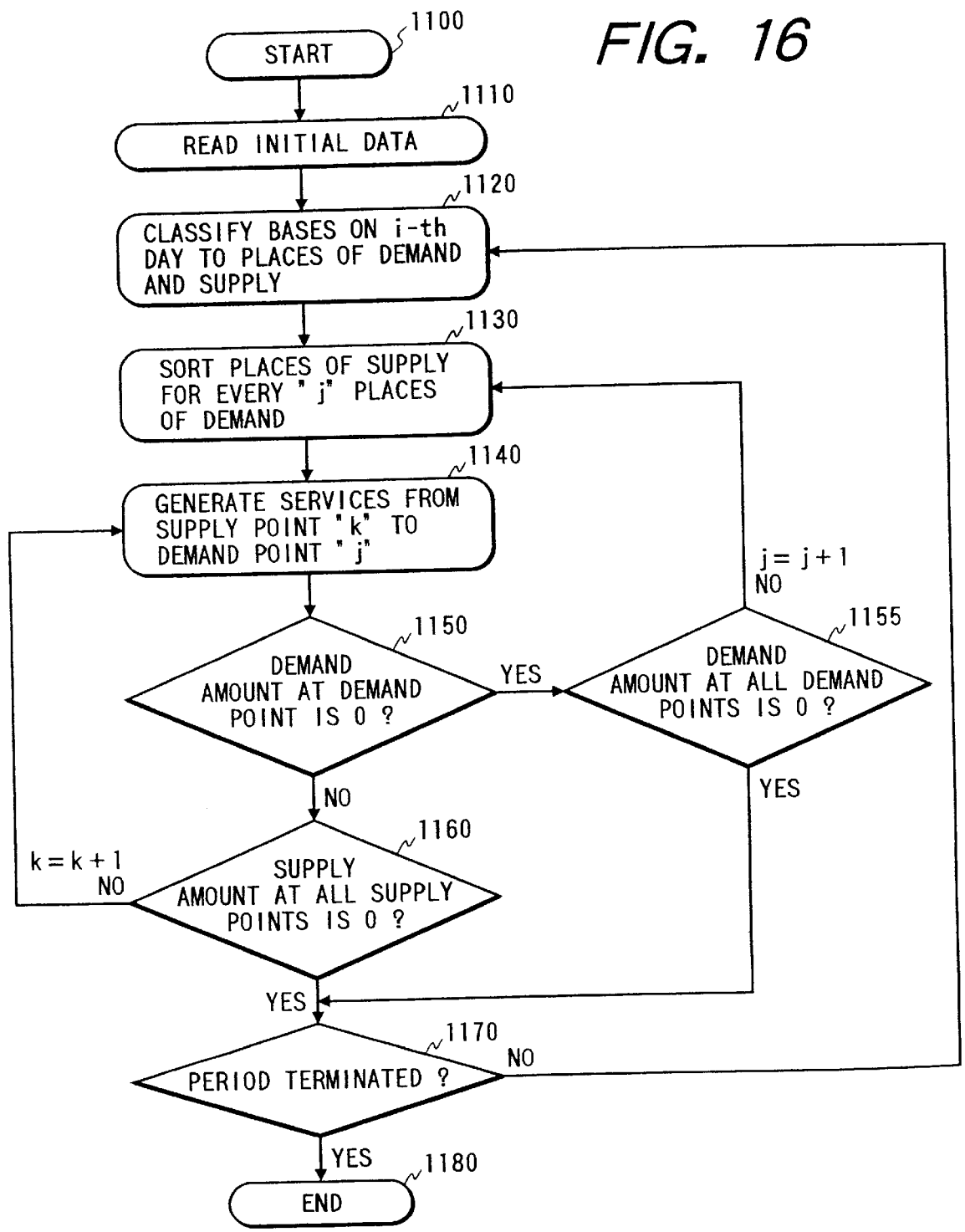
FIG. 16 is a flow chart in high-speed plan setting means.

Next, description will be given on operation of each means of this system. When it is necessary to quickly determine the pallet forwarding plan, the user starts the high-speed planning means 11. The high-speed planning means 11 sets up a pallet forwarding plan at high speed in accordance with the flow chart of FIG. 16.

When the high-speed planning means 11 is started by UI 20 in Step 1100, data stored in the initial data storage unit 31, the actual result data storage unit 32 and the planning result storage unit 33 are read into the storage area 19 in Step 1110.

In this case, for example, transport cost data between physical distribution bases shown in FIG. 27 is read from the initial data storage unit 31. From the planning result storage unit 33, the data on quantity of pallets in excess or in shortage (hereinafter referred as "quantity in excess or shortage") of pallets to standard stock quantity data for the planned days at each physical distribution base are read. (The quantity in excess or shortage is prepared by the pallet quantity predicting means 13.)

In Step 1120, the high-speed planning means 11 classifies each base into place of demand and place of supply based on the data, and demand array and supply array are prepared respectively. In Step 1130, the places of supply are sorted in the order from those with the lower transport cost to the higher from j-th place of demand to each place of supply. In the present example, the places of demand are Aomori, Morioka and Yamagata, and the place of supply is Sendai.

In Step 1140, pallet forwarding services are generated until demand quantity at the place of demand is turned to 0 or the supply quantity at the place of supply is turned to 0 from the place of supply "k" to the place of demand "j". In Step 1150, it is judged whether the demand at the place of demand has been turned to 0 or not. If it is 0, it is judged in Step 1155 whether the demand at the place of demand has been turned to 0 or not. If not, returning to Step 1130, the processing from Step 1140 is carried out for the next place of demand "j (1".

If demand at the place of demand has not been turned to 0 in Step 1150, it is judged in Step 1160 whether supply quantity at all places of supply have been turned to 0 or not. If not turned to 0, returning to Step 1140, the pallet forwarding service from the next place of supply "k (1" to the place of demand "j" is generated. When supply quantity at all places of supply have been turned to 0, it is judged in Step 1170 whether the period in question has been terminated or not. If terminated, all processings are completed in Step 1180. If not terminated, returning to Step 1120, processing for the next day is carried out.

In Step 1155, if demand quantities at all places of demand are 0, the processing on i-th day is completed, and it is turned to Step 1170. The pallet forwarding services determined by the high-speed planning means 11 is stored in the planning result storage unit 33 and is presented to the user via UI 20.

Figure 17:
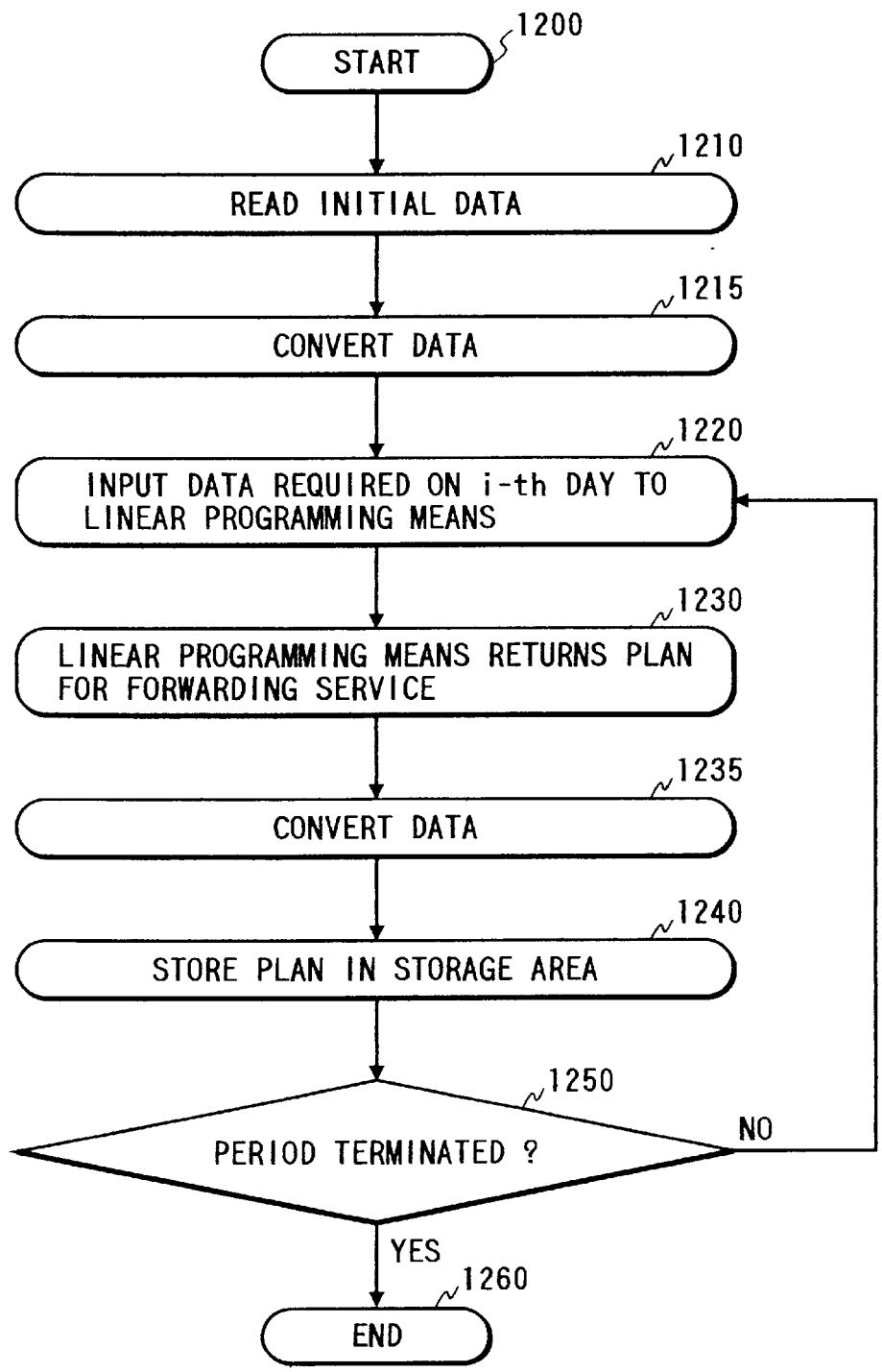
FIG. 17 is a flow chart in forwarding service judging means.

As described above, the high-speed planning means 11 determines pallet forwarding destination and physical distribution base in the order from the lower transport cost to the higher transport cost based on the transport fee between physical distribution bases. Because it is determined according to simple rule, it is possible to process at high speed. When it is necessary to set up a general pallet forwarding plan between a number of physical distribution bases, the user starts the forwarding service judging means 12. The forwarding service judging means 12 determines number of pallet forwarding services or quantity of pallets to be forwarded in accordance with the flow chart of FIG. 17.

When started by UI 20 in Step 1200, the forwarding service judging means 12 reads the data stored in the initial data storage unit 31, the actual result data storage unit 32 and the planning result storage unit 33 in Step 1210. In this case, for example, the data of standard stock quantity data and quantity in excess or shortage of pallets at each physical distribution base shown in FIG. 29 and transport cost data between physical distribution bases shown in FIG. 30 are inputted as data.

In Step 1215, the plan for the first day is set up at first to prepare planning for "n" days. The quantity in excess or shortage on the first day at each physical distribution base is converted to a form, which can be inputted to the linear programming means shown in FIG. 32 using the contents of the supply and demand table of FIG. 31. (This table summarizes transport costs between the place of supply "Si" and the place of demand "Di".)

In FIG. 32, sum of products of pallet quantity $X_{ij}$ to be forwarded from the place of supply "i" to the place of demand "j" and transport cost from the place of supply "i" to the place of demand "j" is expressed in mathematical equations. Also, the fact that total sum of the pallets to be forwarded from each place of supply "i" is less than the quantity of pallets in excess on the first day at the place of supply "i" and that total sum of the pallets to be forwarded to each place of demand "j" is more than the quantity of pallets in shortage on the first day at the place of demand "j".

In Step 1220, the data needed on the first day is inputted to the linear programming means, and it is calculated in such manner that sum of products of pallet quantity and transport cost takes the minimum value. Then, the results shown in FIG. 33 are outputted by the linear programming means in Step 1230.

In Step 1235, this is converted to the data of number of services between the physical distribution bases shown in FIG. 34. The data is added by converting the first day to calendar day, and the data of the results obtained in Step 1240 is stored in the storage area 19.

Next, in Step 1250, it is judged whether the period in question has been terminated or not. If terminated, the data of the storage area 19 is outputted in Step 1260 to the storage unit 33 where the planning results are stored, and the processing is completed. If the period is not yet terminated, returning to Step 1220, the number of services on the next day is determined.

Figure 18:
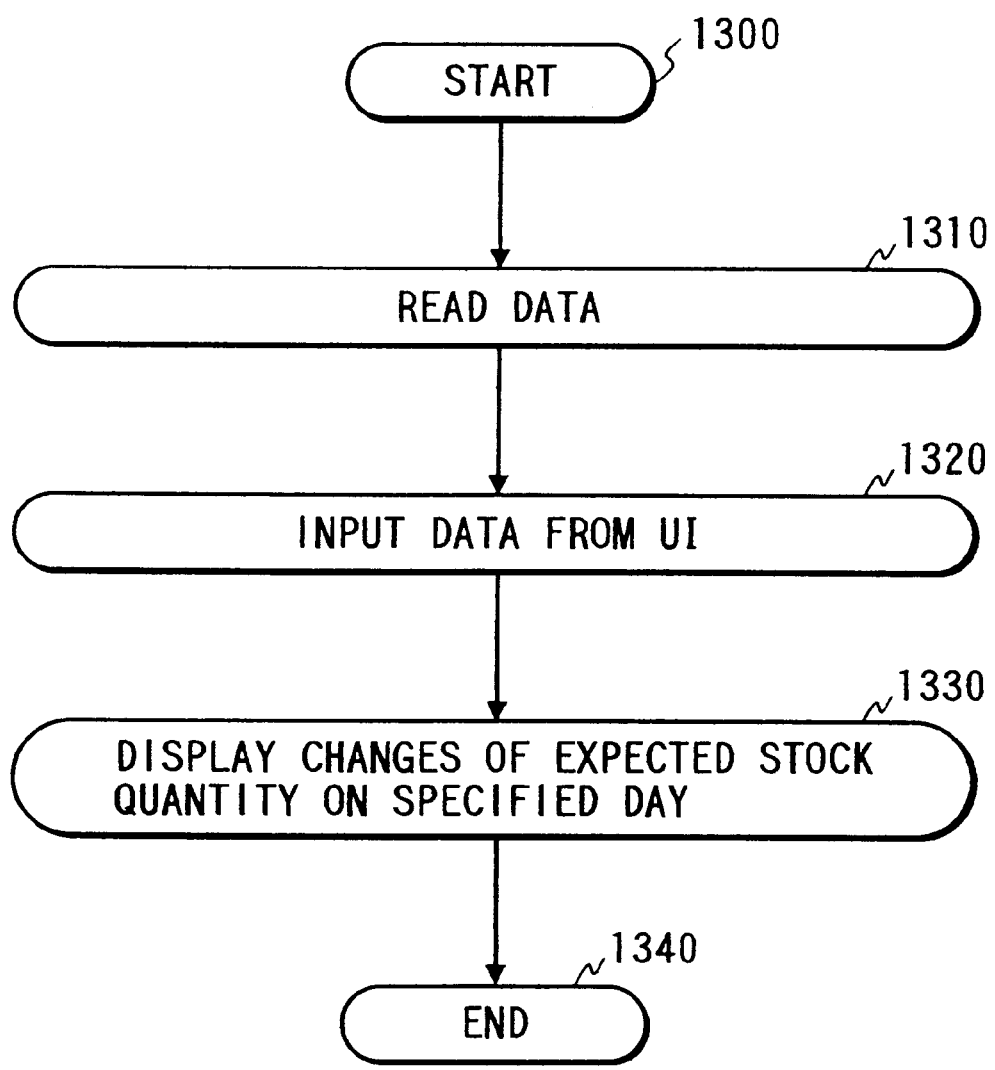
FIG. 18 is a flow chart in pallet quantity predicting means.

When determining the number of forwarding services on the next day, the planning results of the preceding day are reflected to the demand quantity of pallets. As described above, the forwarding service judging means 12 sets up detailed pallet forwarding plan using linear programming method, determines number of forwarding services and quantity of forwarding pallets and presents them to the user. To identify the predicted quantity of pallets present at the physical distribution base, the user starts the pallet quantity predicting means 13. The pallet quantity predicting means 13 predicts quantity of pallets currently present at each physical distribution base according to the flow chart of FIG. 18.

When started by UI 20 in Step 1300, the pallet quantity predicting means 13 reads, for example, transport schedule to enter or leave the physical distribution base (in this case, Asahikawa) shown in FIG. 35, and quantity of pallets to be forwarded by transport service from the data stored in the initial data storage unit 31, the actual result data storage unit 32 and the planning result storage unit 33, and also reads the quantity of pallets to be forwarded to each physical distribution base under the forwarding plan, the delivery schedule interval and the standard stock quantity.

Figure 19:
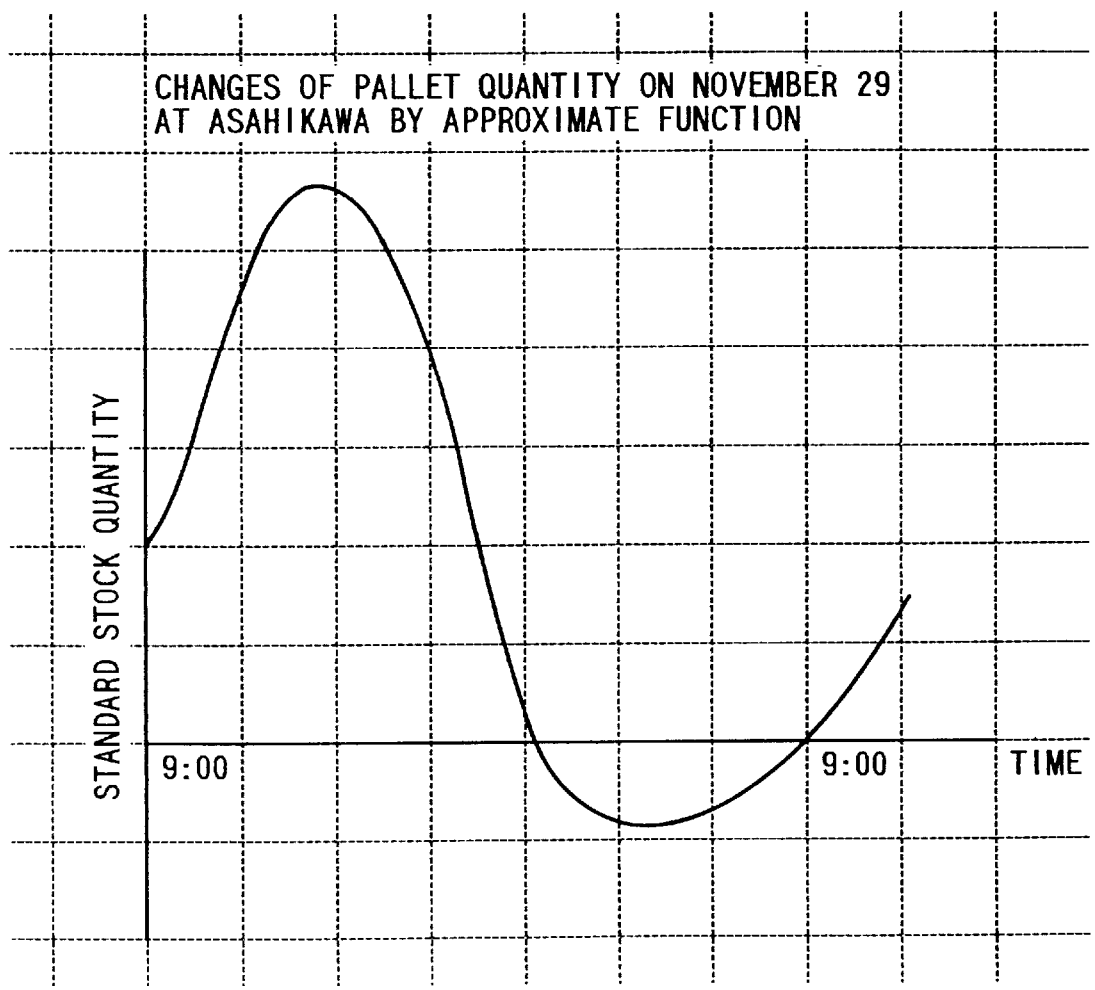
FIG. 19 is a diagram of approximate function of pallet data predicted by pallet quantity predicting means.

When the date "November 29" to be simulated and the name of the physical distribution base "Asahikawa" are inputted from UI 20 in Step 1320, the pallet quantity predicting means 13 calculates in Step 1330 time series data of the pallet quantity on the specified day at the specified physical distribution base from the data thus read and analyzes this to obtain a function, which approximates variation of pallet quantity on one day. The result is stored in the planning result storage unit 33 and is displayed as shown in FIG. 19 via UI 20, and the processing is completed in Step 1340.

As described above, the pallet quantity predicting means 13 presents daily variation of pallet quantity at the specified physical distribution base in comparison with the standard stock quantity. If the pallet quantity is more than the standard stock quantity, it means that pallets are in excess. If it is lower than the standard stock quantity, pallets are in shortage.

Figure 20:
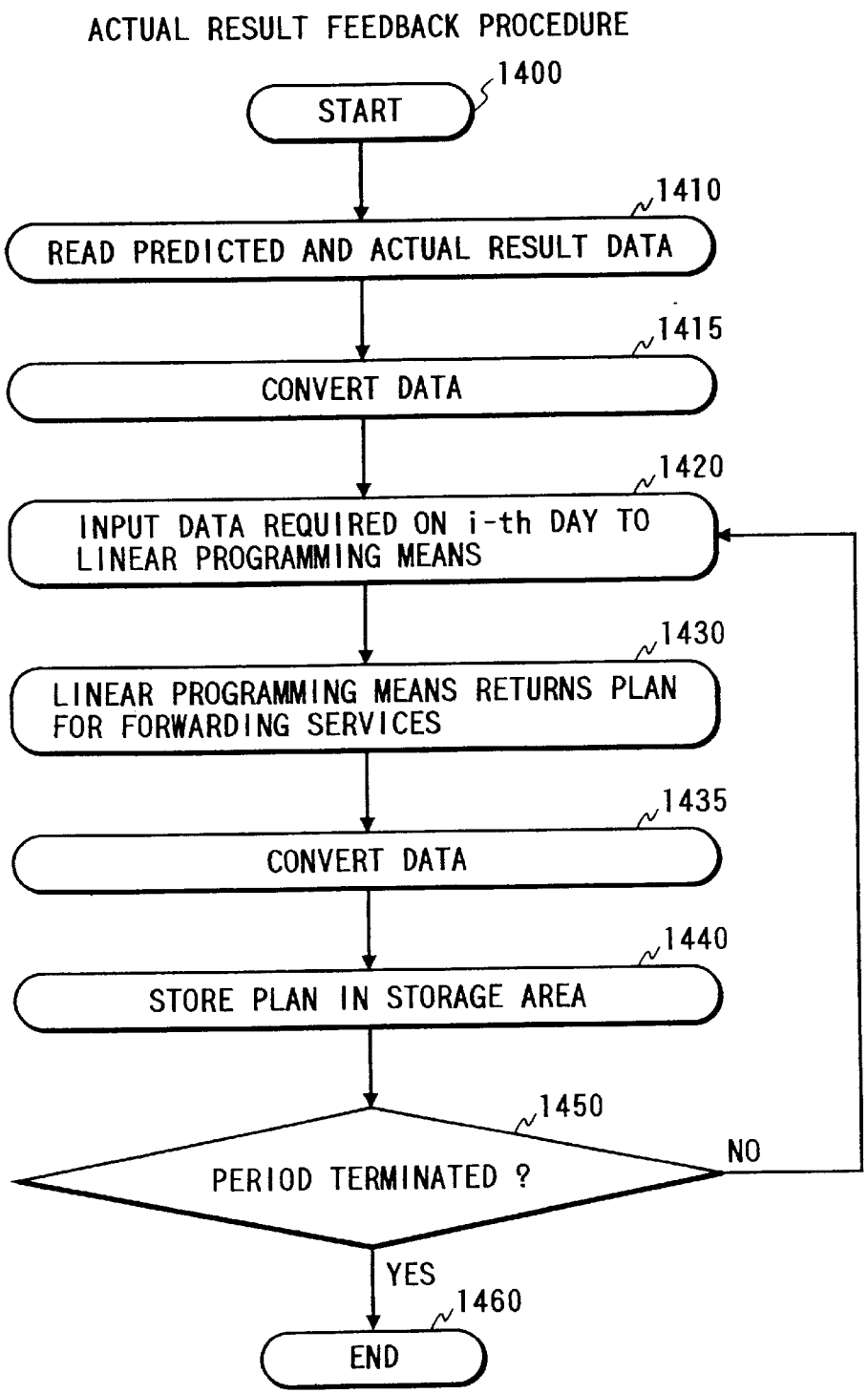
FIG. 20 is a flow chart in actual result feedback means.

When actual pallet quantity (actual value) at each physical distribution base has been identified, and if the quantity is different from the predicted quantity of pallets (planned quantity) needed, the user starts the actual result feedback means 14 and sets up the pallet forwarding plan to fill the gap. In this case, the actual result feedback means 14 operates according to the flow chart of FIG. 20, and the forwarding plan is determined.

When started by UI 20 in Step 1400, the actual result feedback means 14 reads in Step 1410 standard stock quantity data at each physical distribution base, complementary difference quantity between planned pallet quantity and actual quantity (difference between planned quantity and actual quantity) as shown in FIG. 36 and transport cost between physical distribution bases shown in FIG. 30 from the data stored in the initial data storage unit 31, the actual result data storage unit 32 and the planning result storage unit 33 into the storage area 19.

Figure 21:
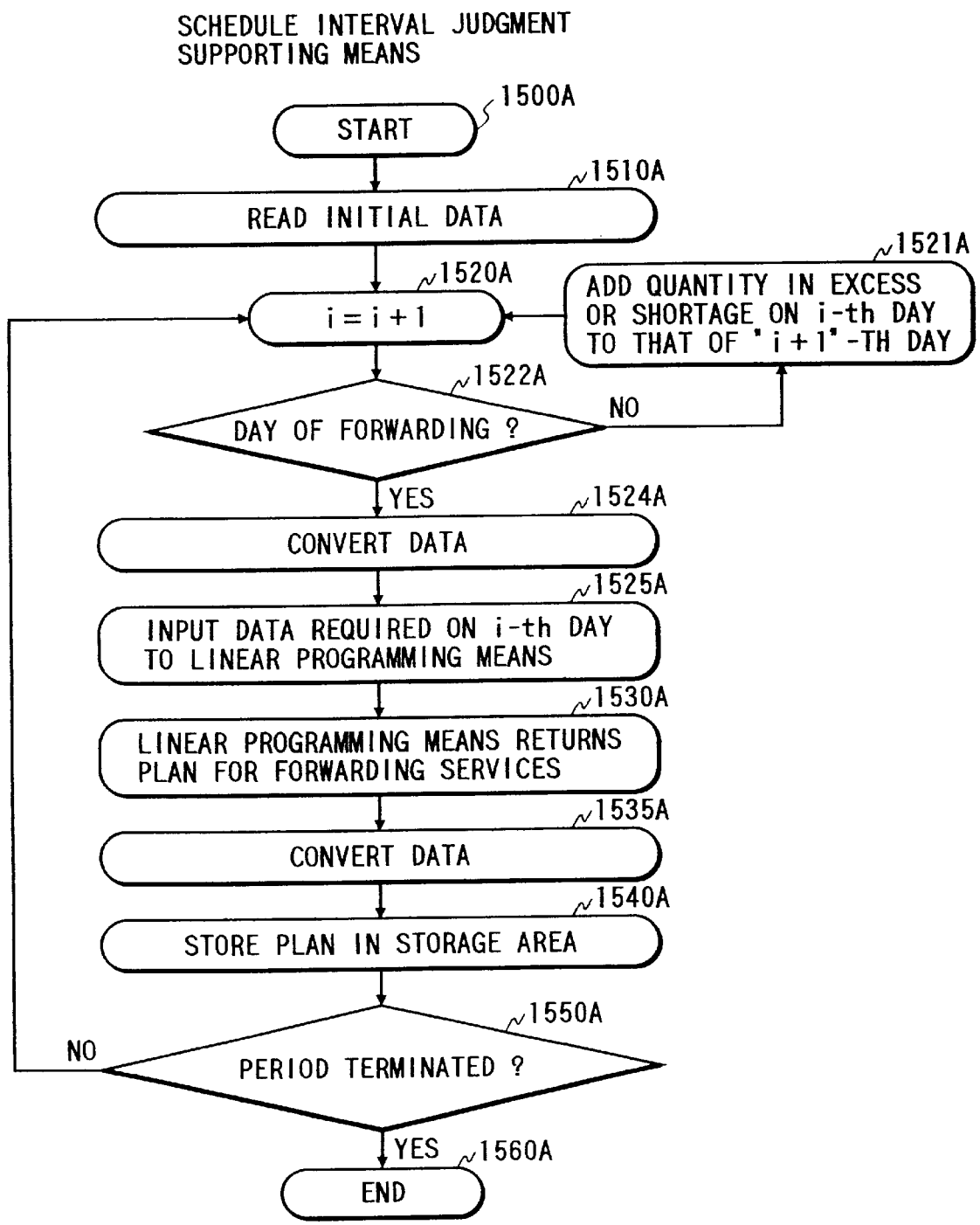
FIG. 21 is a flow chart in schedule interval judgment supporting means.

Next, the actual feedback means 14 executes the same procedure (Steps 1415 to 1416) as the procedure after Step 1215 in case of setting of the pallet forwarding plan (FIG. 17), and the planning results corresponding to FIG. 34 are outputted. The planning results are stored in the planning result storage unit 33 or are presented to the user via UI 20. When the schedule interval of the pallet forwarding service is set to 2 days, for example, the user starts the schedule interval judgment supporting means 15A to find out how the pallet forwarding plan is changed. The schedule interval judgment supporting means 15A operates according to the flow chart of FIG. 21 and presents to the user the pallet forwarding plan when the schedule interval of pallet forwarding service is set to the specified number of days.

When started by UI 20 in Step 1500A, the schedule interval judgment supporting means 15A reads in Step 1510A, for example, the standard stock quantity data at each distribution base and quantity in excess or shortage of pallets for 3 days shown in FIG. 37 and transport cost between distribution bases shown in FIG. 38 into the storage area 19 based on the data stored in the initial data storage unit 31, the actual result data storage unit 32 and the planning result storage unit 33. Also, the schedule interval specified by the user, i.e. 2 days; is stored in the storage area 19 as parameter.

In Step 1520A, it is supposed that the initial value i=0, and schedule counter value is calculated. In Step 1522A, it is judged whether the counter value is equal to the specified schedule interval, i.e. 2 days, or not. If it is equal, the quantity in excess or shortage on the first day is added to that of the second day in Step 1521A.

In Step 1520A, the schedule counter value is equalized on the second day, and it is converted in Step 1524A to a form which can be inputted to linear programming means shown in FIG. 39 with respect to the quantity in excess or shortage on the second day, and it is inputted to the linear programming means in Step 1525A.

In Step 1530A, the value of FIG. 40 is outputted from the linear programming means. In Step 1533A, this is converted to the data of the number of services between the physical distribution bases. The data is added to convert the first day to calendar day. In Step 1540A, the results are stored into the storage area 19. In Step 1550A, it is judged whether the period in question has been terminated or not. If not terminated, return to Step 1520A. If terminated, the data of the storage area 19 is outputted to the planning result storage unit 33, and the processing is terminated is Step 1560A.

Figure 22:
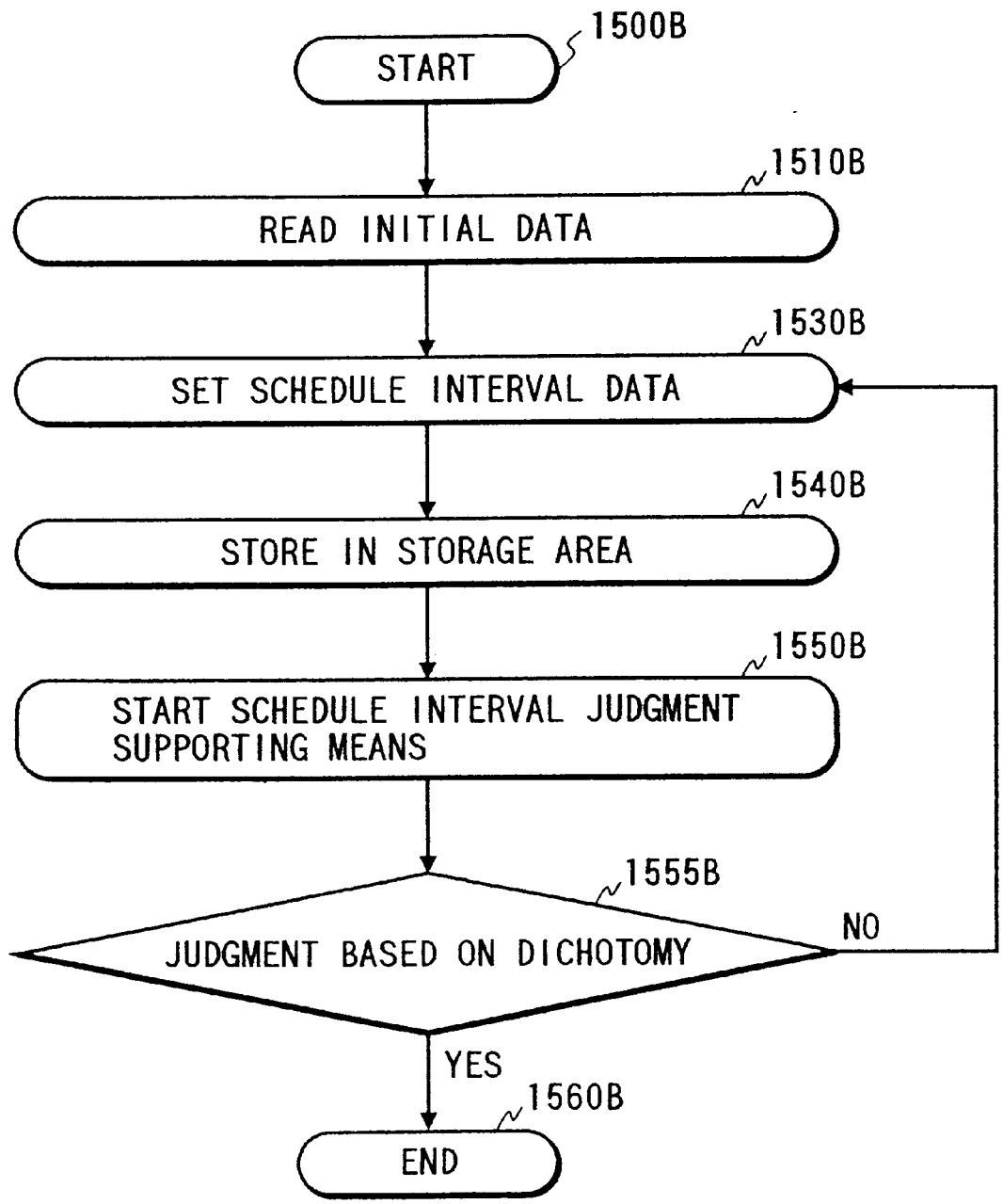
FIG. 22 is a flow chart in schedule interval automatic judging means.

After the completion of the processing, the planning result is displayed on UI 20. If the user is not satisfied, the parameter of the schedule interval is changed, and the schedule interval judgment supporting means 15A is started again. Also, to set the schedule interval of pallet forwarding to the optimal value, the user starts the schedule interval automatic judging means 15B. The schedule interval automatic judging means 15B operates according to the flow chart of FIG. 22, and the schedule interval of pallet forwarding is determined.

When started by UI 20 in Step 1500B, the schedule interval automatic judging means 15B reads the data of maximum value of the initialized schedule interval (e.g. 15) from the initial data storage unit 31 as default value. In Step 1530B, the schedule interval is set to 1, and this is stored into the storage area 19 in Step 1540B. In Step 1550B, the schedule interval supporting means 15A is started, and the pallet forwarding plan at the preset schedule interval is calculated.

In Step 1555B, output of the schedule interval support means 15A is judged by dichotomy. Maximum value of schedule interval is obtained in such range that the number of pallet forwarding services does not exceed a predetermined value. The schedule interval is set again, and the procedure of Step 1530B and after is repeated. If maximum value is obtained, the maximum value as well as the schedule interval at that time and the schedule are outputted as the planning result, and the processing is completed in Step 1560B.

Figure 23:
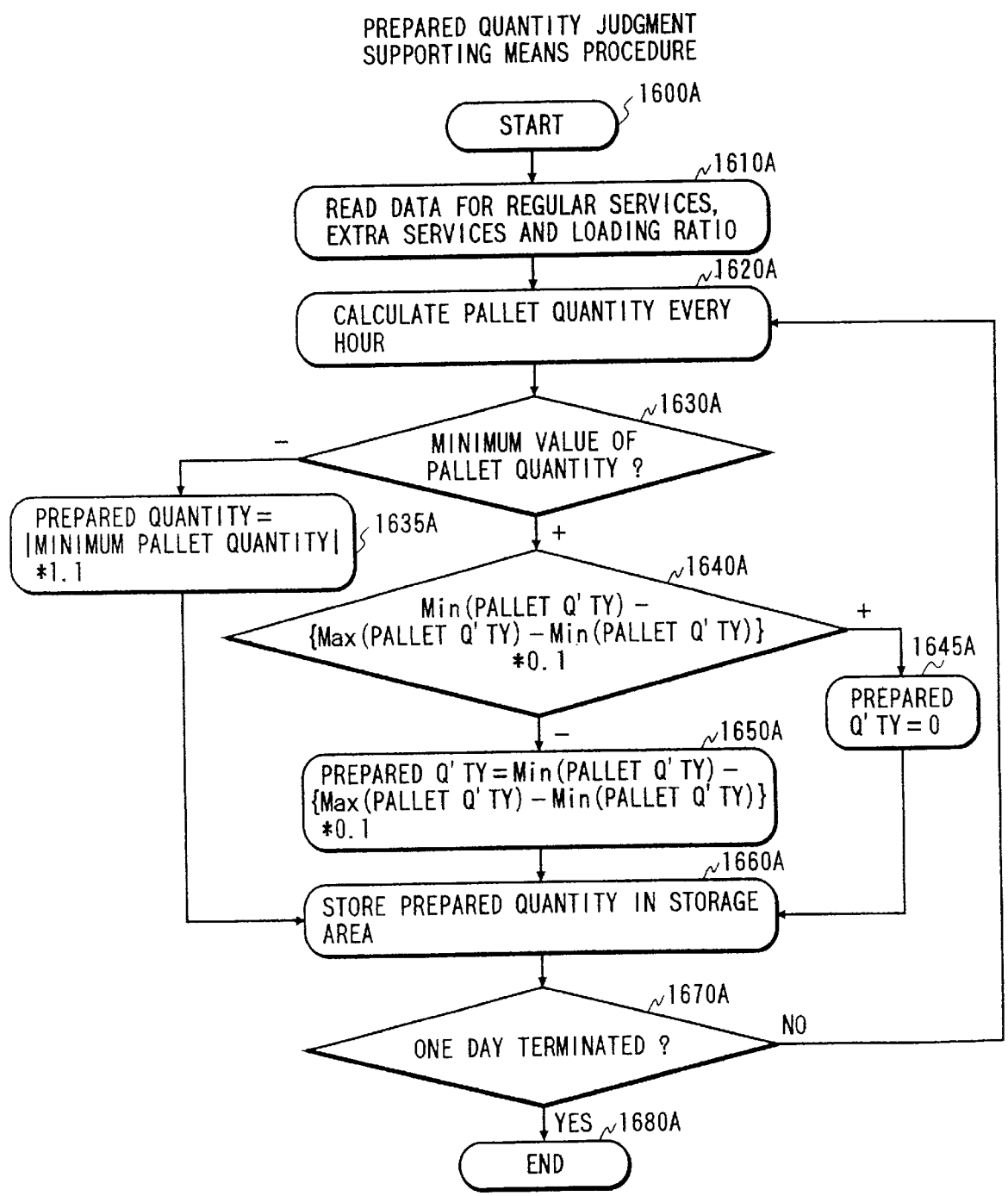
FIG. 23 is a flow chart in standard stock quantity judgment supporting means.

Then, the schedule interval automatic judging means 15B presents the pallet forwarding plan when the schedule interval of the pallet forwarding services is set to the optimal value to the user. Also, to identify the pallet quantity to be prepared at physical distribution base, the user starts the standard stock quantity judgment supporting means 16A. The standard stock quantity judgment supporting means 16A operates according to the flow chart of FIG. 23.

When started by UI 20 in Step 1600A, the standard stock quantity judgment supporting means 16A reads in Step 1610A the transport service timetable shown in FIG. 41 and the data of pallet loading ratio (e.g. average loading ratio= 60; average pallet quantity varying ratio=0.1) from the initial data storage unit 31.

In Step 1620A, the standard stock quantity judgment supporting means 16A calculates pallet quantity (difference from the standard stock quantity) at every hour as shown in FIG. 42 based on the timetable and the loading ratio of FIG. 41. In Step 1630A, the quantity of pallets in time zone when the pallet quantity reaches minimum within a day is detected, and it is judged whether the minimum value is positive or negative. If negative, the quantity to be prepared is determined in Step 1635A as $\lambda$pallet quantity minimum value$\lambda$ * (1+varying ratio), and it is stored into the storage area 19 in Step 1660A.

If the minimum value is positive in Step 1630A, it is judged in Step 1640A whether the value "Max (pallet quantity) - {Max (pallet quantity) - Min (pallet quantity)} * variation ratio" is positive or negative. In case of Sapporo, if it is supposed that 30 at 2:00 is minimum and 150 at 3:.00 is maximum, the value is 18. If this value is negative, absolute value of this is determined as the quantity to be prepared in Step 1650A.

If it is positive in Step 1645A, the quantity to be prepared is considered as 0. In the example of Sapporo, the quantity of pallets to be prepared is 0. In Step 1670A, this is repeated by the number of the days in the planned period. When the sum of the quantity to be prepared in the whole schedule and the initial value of the standard stock quantity is maximum, this is considered as the standard stock quantity in the planned period. In Step 1680A, the user confirms the results by UI 20 and stores the results in the initial data storage unit 31, and the processing is completed.

Figure 24:
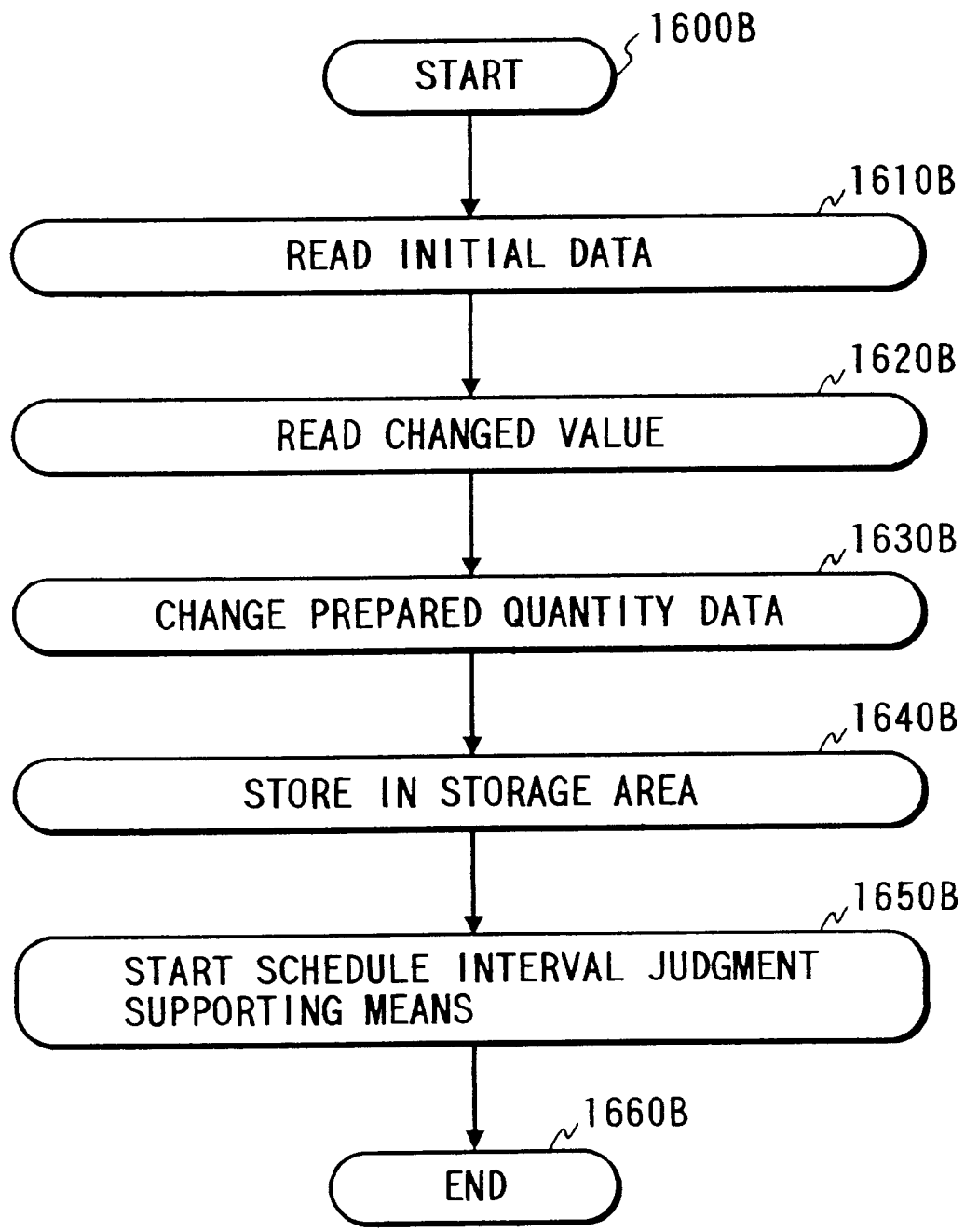
FIG. 24 is a flow chart in standard stock quantity automatic judging means.

Also, to identify the pallet forwarding plan when the standard stock quantity at a certain physical distribution base has been changed, the user starts the standard stock quantity automatic judging means 16A. In this case, the standard stock quantity automatic judging means 16A operates according to the flow chart of FIG. 24.

An example is given on the case where the standard stock quantity at Urawa is changed. When started by UI 20 in Step 1600B, the standard stock quantity automatic judging means 16B reads in Step 1610B default value of the standard stock quantity at each physical distribution base as shown in FIG. 43 and the standard stock quantity and the quantity in excess or shortage at each physical distribution base shown in FIG. 45 as the initial data. In the data of quantity in excess or shortage of FIG. 45, the standard stock quantity is a variable. Next, in Step 1620B, the changed value of the standard stock quantity at Urawa (Urawa: 400) is read.

In Step 1630, the standard stock quantity automatic judging means 16B changes the data of the quantity to be prepared using the standard stock quantity judgment supporting means 16A. Base on this data, the data of the quantity in excess or shortage shown in FIG. 45 is changed as shown in FIG. 46. In Step 1640B the excess/shortage table is stored in the storage area 19. In Step 1650B, the schedule interval judgment supporting means 15A is started. In this case, the schedule interval judgment supporting means 15A does not read the excess/shortage table from the initial data storage unit 31 as the initial value, but, using the excess/shortage table on the storage area 19, it executes the procedure of FIG. 21 and presents the optimal value of the schedule interval in the pallet forwarding services and the pallets forwarding plan. The user confirms the results by UI 20, and the processing is completed in Step 1660B. If the user is not satisfied, the change value of the standard stock quantity is changed again, and the user starts the standard stock quantity judging means 16B.

Figure 25:
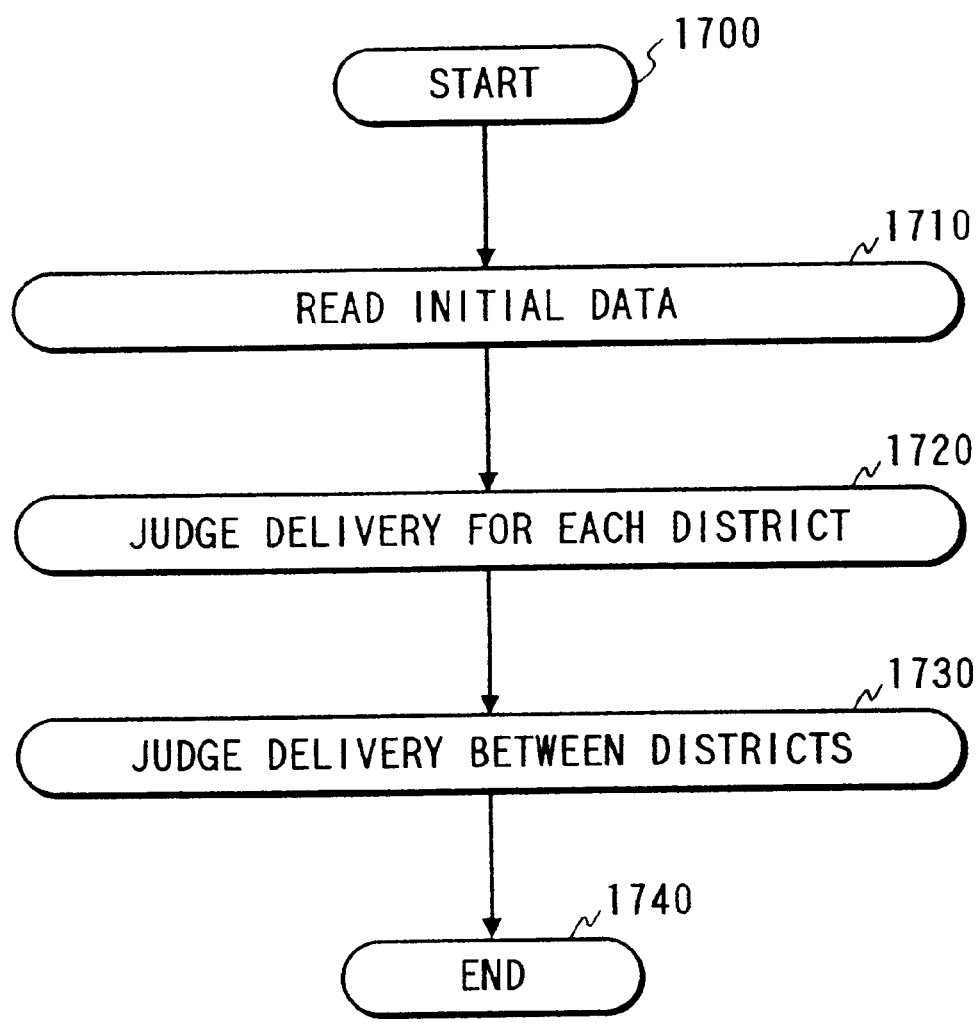
FIG. 25 is a flow chart in hierarchical planning means.

When setting the pallet forwarding services, the user starts the hierarchical planning means 17. The hierarchical planning means 17 operates according to the flow chart of FIG. 25. When started by UI 20 in Step 1700, the hierarchical planning means 17 reads the initial data shown in FIG. 47, for example, from the data stored in the initial data storage unit 31, the actual result data storage unit 32 and the planning result storage unit 33. In the data of FIG. 47, the physical distribution bases are classified into 3 regional delivery districts of Tohoku, Kanto and Kyushu, and there are places of Sendai/Morioka/Aomori, Maebashi/Urawa/Yokohama and Fukuoka/Saga/Oita in these districts respectively.

In Step 1720, the hierarchical planning means 17 starts the forwarding service judging means 12 and determines pallet forwarding services for each district. In Step 1730, pallet forwarding services between the bases in each district are determined as shown in FIG. 48 by the forwarding service judging means 12. The solution is outputted as the planning results, and the processing is completed in Step 1740.

As described above, the hierarchical planning means 17 sets up the pallet forwarding plan to match the hierarchical structure of the wide area physical distribution network.

Figure 26:
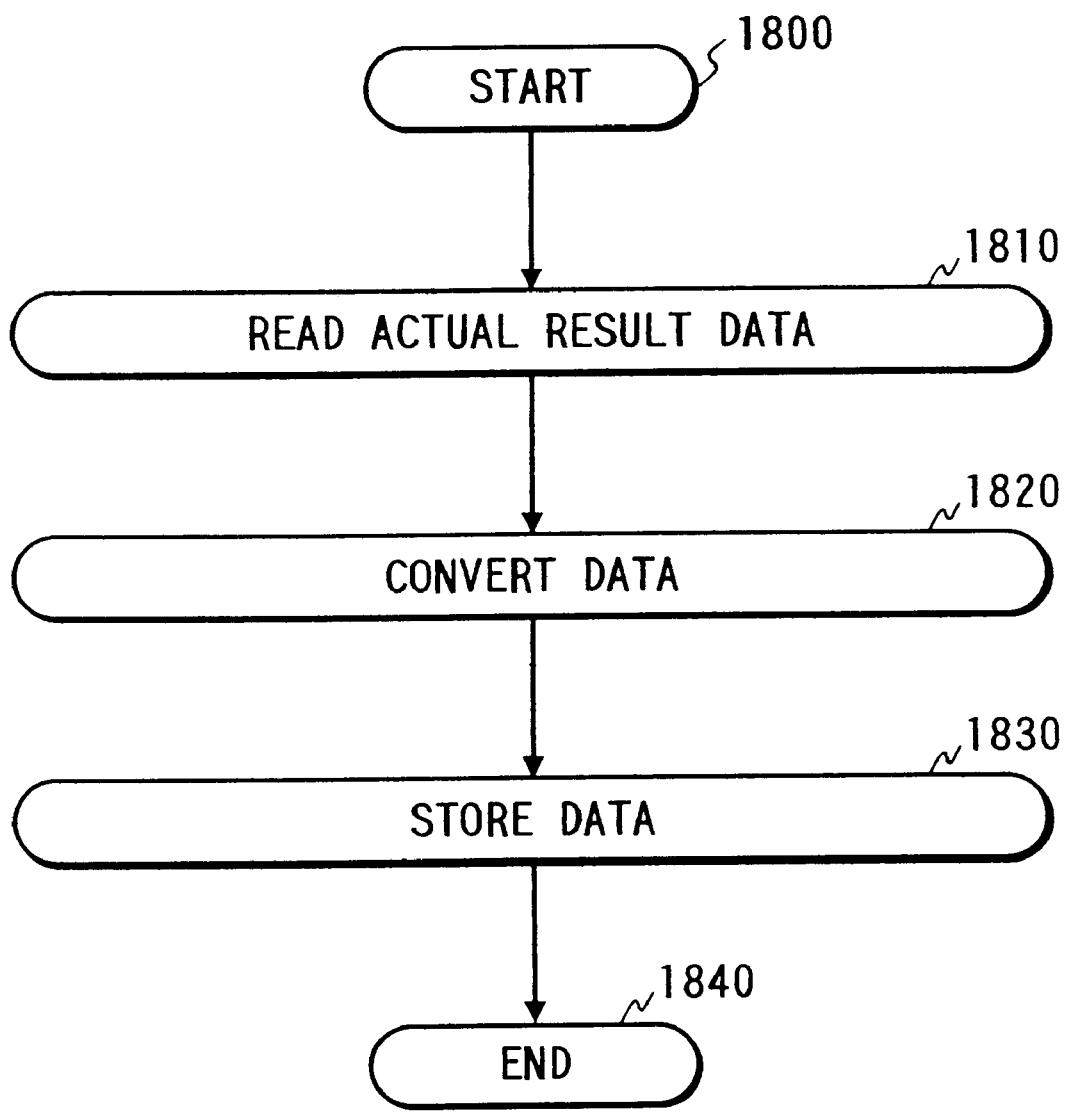
FIG. 26 is a flow chart in actual result data automatic collecting means.

Also, the actual result data automatic collecting means 18 collects actual result data of the pallets according to the flow chart of FIG. 26 and changes them to necessary data.

When started by the time control means in Step 1800, the actual data automatic collecting means 18 reads the actual result data shown in FIG. 49, for example, from the wireless tag device 41 in Step 1810. In Step 1820, these data are processed and are changed to the data shown in FIG. 36.

When all data are changed in Step 1830, these data are stored in the actual result data storage unit 32, and the processing is completed in Step 1840.

As it is evident from the above description, it is possible according to the system for controlling physical distribution pallets of the present invention to carry out stock control of pallets in wide area physical distribution in uniform and easy manner. It is also possible to accurately predict supply and demand of pallets and to set up a forwarding plan to minimize forwarding cost of the pallets, and further to find out the optimal transport route to the forwarding destination. As a result, wide area physical distribution can be accomplished in smooth manner.

Also, it is possible according to the system for controlling physical distribution pallets of the present invention to set up a pallet forwarding plan and to present useful control information to cope with diversified requirements. Specifically, the present system not only makes it possible to set up a detailed pallet forwarding plan for a great number of physical distribution bases, but also to promptly present pallet forwarding plan for a small number of physical distribution bases.

Also, the present system can predict and present the changes over time of pallet quantity at each physical distribution base. Further, it is possible to set up a pallet forwarding plan to accomplish the forwarding of the planned quantity based on the actual result data of the pallets.

Further, it is possible according to the present system to simulate the pallet forwarding plan when schedule interval of the pallet forwarding services is changed and to set the optimal schedule interval based on such simulation. In addition, it is also possible to present the quantity of pallets to be prepared as the standard stock at each physical distribution base and to show the pallet forwarding plan in case the standard stock quantity is changed.

Also, it is possible by the present system to set up a pallet forwarding plan to match hierarchical structure of the wide area physical distribution network.

What is claimed is:

1. A system for controlling physical distribution pallets used for transportation of freight in wide area physical distribution, comprising:

a wireless tag mounted on each pallet, said wireless tag storing pallet control information of the pallet and operable for transmitting said pallet control information in wireless by generating radio wave energy in response to receipt of external radio waves generated externally thereof;

wireless detecting means installed at each of a plurality of physical distribution bases for transmitting said external radio waves to said wireless tag and for detecting pallet control information transmitted from the wireless tag mounted on each pallet arriving at or departing from a respective physical distribution base;

stock data storage means for receiving and storing the pallet control information detected by said wireless detecting means via a wide area communication network; and pallet status judging means for judging whether a pallet identified by data stored in said stock data storage means is empty or not based on the pallet control information of said pallet.

2. The system for controlling physical distribution pallets according to claim 1, wherein said pallet status judging means judges, on the status of "a pallet" newly stored in said pallet stock data storage means, that the status is empty in case where the pallet is not stored in memory of said pallet stock data storage means and where the predetermined standard time needed for unloading of freight has elapsed after the time detected by said wireless detecting means.

3. The system for controlling physical distribution pallets according to claim 1, further comprising:

transport schedule storage means for storing information relating to a schedule of transport services and supply, and demand predicting means for predicting supply and demand of pallets at said physical distribution base according to the information stored in said transport schedule storage means and according to a quantity of pallets in an empty status at the physical distribution base.

4. The system for controlling physical distribution pallets according to claim 3, wherein said supply and demand predicting means predicts a quantity of pallets in excess or in shortage at a physical distribution base from a difference between a quantity of pallets expected to arrive by said transport service and a quantity of pallets expected to depart and from the current quantity of pallets in an empty status.

5. The system for controlling physical distribution pallets according to claim 4, wherein said supply and demand predicting means corrects said predicted quantity of pallets in excess or in shortage based on knowledge or constraint condition relating to supply and demand of pallets.

6. The system according to claim 1, wherein said wireless tag comprises means for receiving information transmitted from said wireless detecting means and means for storing the received information, and wherein said wireless detecting means comprises means for transmitting said information.

7. A system as recited in claim 1, wherein said wireless tag is free of internal power sources.

8. A system for controlling physical distribution pallets for controlling a stock of pallets and for setting up a pallet forwarding plan in wide area physical distribution, comprising:

a user interface for accepting request of a user and for displaying the pallet forwarding plan thus set up;

a wireless tag device for automatically acquiring information relating to entry or departure of pallets to or from stock, said wireless tag device operable for transmitting said information in wireless by generating radio wave energy in response to receipt of radio waves generated externally thereof;

accumulating means for accumulating information of acquired pallets or information of the pallet forwarding plan thus set up; and a system main unit for reading information of said accumulating means and for setting up the pallet forwarding plan requested by the user.

9. The system for controlling physical distribution pallets according to claim 8, wherein said system main unit comprises high-speed planning means for setting up said forwarding plan to forward the pallets in the order from a physical distribution base with lower transport cost to a base with higher transport cost between physical distribution bases among the distribution bases where pallets are in excess compared with the physical distribution base where pallets are in shortage.

10. The system for controlling physical distribution pallets according to claim 8, wherein said system main unit comprises forwarding service judging means for determining a number of pallet forwarding services or quantity of pallets to be forwarded between the physical distribution bases using a linear programming method.

11. The system for controlling physical distribution pallets according to claim 8, wherein said system main unit comprises pallet quantity predicting means for analyzing time series data of pallet quantity at each physical distribution base and for obtaining a function, which approximates the data as data for predicting pallet quantity.

12. The system for controlling physical distribution pallets according to claim 8, wherein said system main unit comprises actual result feedback means for obtaining the pallet forwarding plan to eliminate a difference between an actual value and a planned value of pallet quantity at each physical distribution base using a linear programming method.

13. The system for controlling physical distribution pallets according to claim 8, wherein said system main unit comprises schedule interval judgment supporting means for preparing a pallet forwarding plan based on specified delivery interval data for the forwarding pallet.

14. The system for controlling physical distribution pallets according to claim 13, wherein said system main unit comprises forwarding schedule interval automatic judging means for automatically judging an adequate delivery interval for forwarding a pallet using said schedule interval judgment supporting means.

15. The system for controlling physical distribution pallets according to claim 8, wherein said system main unit comprises standard stock quantity judgment supporting means for calculating standard stock quantity of pallets at physical distribution bases according to a maximum value and a minimum value of pallet quantity which changes over time at each physical distribution base.

16. The system for controlling physical distribution pallets according to claim 8, wherein said system main unit comprises standard stock quantity automatic judging means for presenting a pallet forwarding plan in case a pallet standard stock quantity at a physical distribution base is specified using said standard stock quantity judgment supporting means and said schedule interval judgment supporting means.

17. The system for controlling physical distribution pallets according to claim 8, wherein said system main unit comprises actual result data automatic collecting means for converting information obtained from said wireless tag device to pallet control information.

18. The system for controlling physical distribution pallets according to claim 8, wherein said wireless tag device inputs data such as pallet departing point, arrival point, and time of entry or departure to or from stock into said actual result data automatic collecting means.

19. The system according to claim 8, further comprising transmitting means for transmitting information, and wherein said wireless tag device comprises means for receiving information transmitted from said transmitting means and means for storing received information.

20. A system as recited in claim 8, wherein said wireless tag is free of internal power sources.

* * * * *

UNITED STATES PATENT AND TRADEMARK OFFICE
CERTIFICATE OF CORRECTION

PATENT NO.     : 6,125,306  
DATED          : September 26, 2000  
INVENTOR(S)    : Takanori Shimada et al.

Page 1 of 1

It is certified that error appears in the above-identified patent and that said Letters Patent is hereby corrected as shown below:

Section [56] following 62-259411 11/1987 Japan; please insert the following:
--OTHER PUBLICATIONS Imai, et al: "A Study on the Short Period Planning for the Distribution of Empty Sea-Born Containers", Navigation Association of Japan; No. 81, pp. 1-8.

Kojima, et al: "The Building of a Simulation System for Prediction of the Number of Necessary Pallets", pp. 98-102.

Fukumra, et al: "Planning the Forwarding of Empty Containers Using a Mathematical Programming method", RTRI REPORT, Vol. 8, No. 2, February, 1994, pp. 39-44.

Kato, et al: "A Study on Pallet Transportation Problem", 50th National Conference of Information Processing Society (First Term 1995), pp. 1-383 and 1-384.

Fukutani, et al: "Freight Wave Transportation Plan", Operations Research, August 1993.

Signed and Sealed this

Third Day of July, 2001

*Attest:*

*Attesting Officer*

NICHOLAS P. GODICI  
*Acting Director of the United States Patent and Trademark Office*